(12) United States Patent
Li et al.

(10) Patent No.: US 11,635,664 B2
(45) Date of Patent: Apr. 25, 2023

(54) LIQUID CRYSTAL FILM WINDOW PROVIDING DISPLAY AND DIMMING OPERATIONS

(71) Applicant: Wicue, Inc., Cupertino, CA (US)

(72) Inventors: Fenghua Li, Cupertino, CA (US); Martin Hainfellner, München (DE)

(73) Assignee: Wicue, Inc., Cupertino, CA (US)

( * ) Notice: Subject to any disclaimer, the term of this patent is extended or adjusted under 35 U.S.C. 154(b) by 0 days.

(21) Appl. No.: 17/544,083

(22) Filed: Dec. 7, 2021

(65) Prior Publication Data

US 2022/0179251 A1 Jun. 9, 2022

Related U.S. Application Data

(60) Provisional application No. 63/122,447, filed on Dec. 7, 2020.

(51) Int. Cl.
| | |
|---|---|
| *G02F 1/139* | (2006.01) |
| *G02F 1/137* | (2006.01) |
| *G02F 1/1333* | (2006.01) |
| *B60J 3/04* | (2006.01) |

(52) U.S. Cl.
CPC ........ *G02F 1/1396* (2013.01); *G02F 1/13725* (2013.01); *G02F 1/133305* (2013.01); *B60J 3/04* (2013.01)

(58) Field of Classification Search
CPC ............ G02F 1/1396; G02F 1/133305; G02F 1/13725; G02F 2201/44; B60J 3/04
See application file for complete search history.

(56) References Cited

U.S. PATENT DOCUMENTS

| | | | |
|---|---|---|---|
| 2008/0231934 A1* | 9/2008 | Knafou | ............. B32B 17/10504 |
| | | | 359/290 |
| 2017/0082887 A1* | 3/2017 | Kubota | ............... H01L 27/3232 |
| 2019/0118624 A1* | 4/2019 | Chu | ........................ G02F 1/153 |
| 2020/0235332 A1* | 7/2020 | Kobayashi | .......... H01L 51/5246 |

* cited by examiner

*Primary Examiner* — Donald L Raleigh
(74) *Attorney, Agent, or Firm* — PV IP PC; Wei Te Chung; Ude Lu

(57) ABSTRACT

In one example, a liquid crystal (LC) assembly includes a first curved glass layer and a second curved glass layer. The LC assembly further includes a film-based, flexible LC stack structure between the first curved glass layer and the second curved glass layer. The film-based, flexible LC stack structure includes Guest-Host (GH) liquid crystals. The film-based, flexible LC stack structure is configured to provide both a display operation for displaying content to one or more user and a dimming operation for reducing a transmittance level of light passing through the LC assembly.

12 Claims, 18 Drawing Sheets

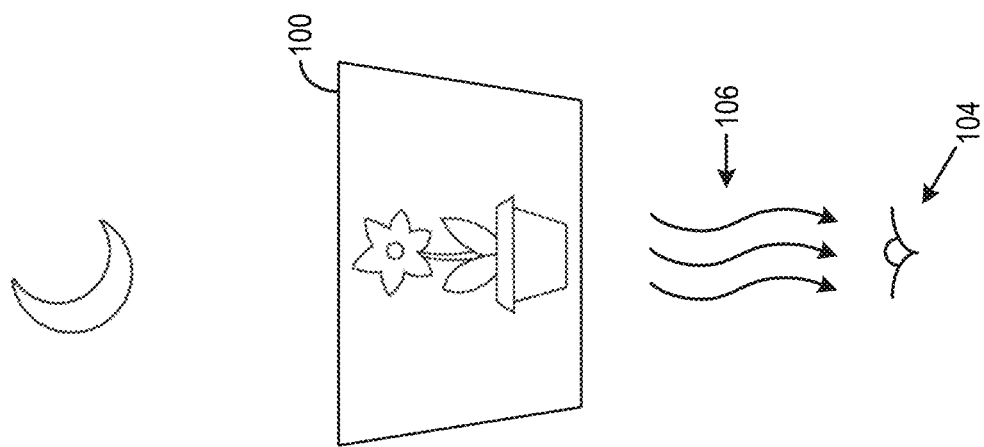
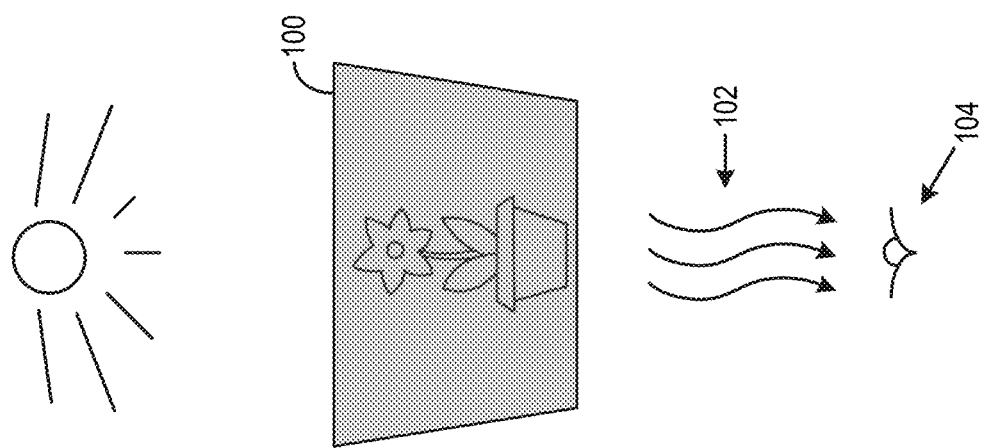
FIG. 1A

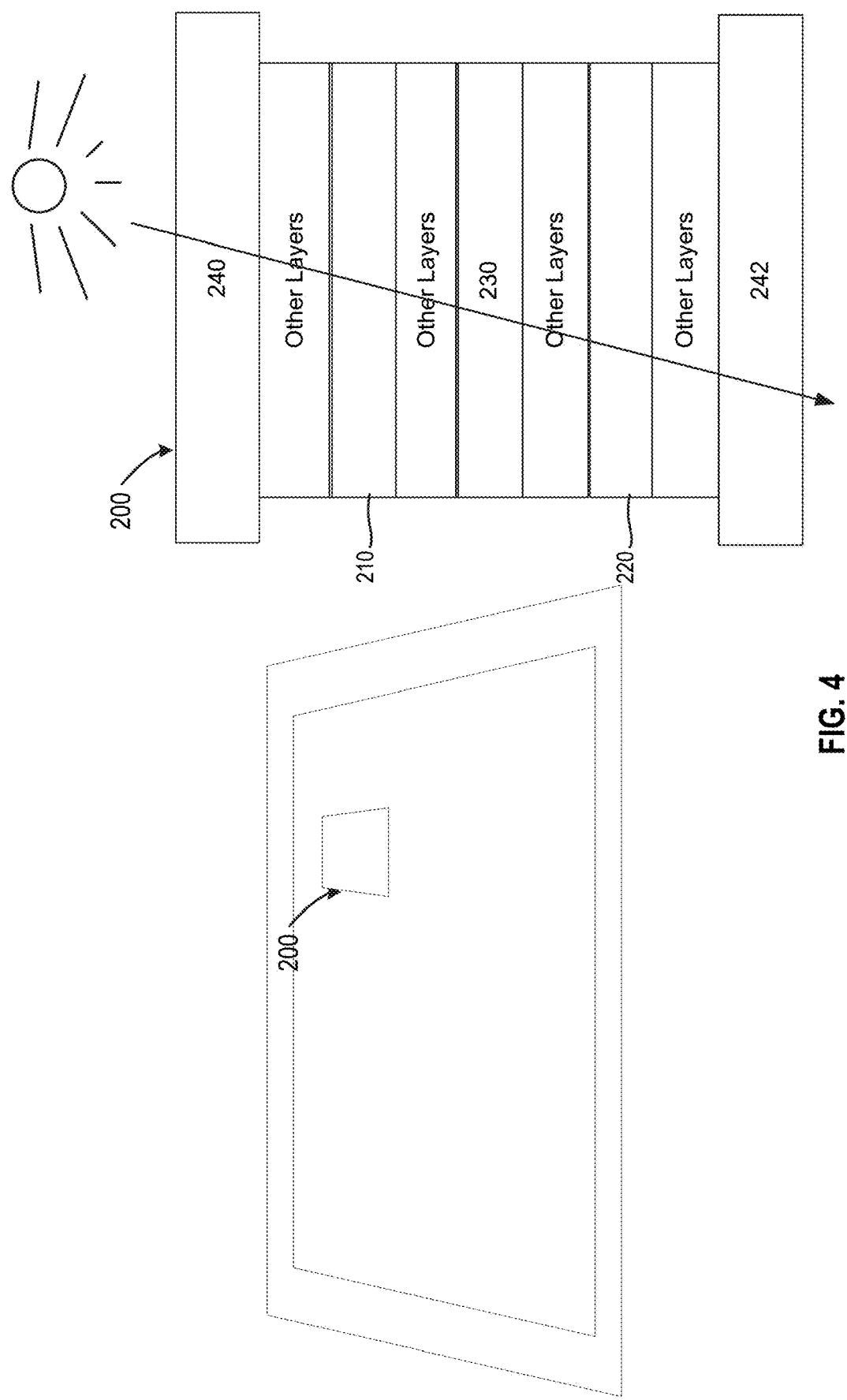

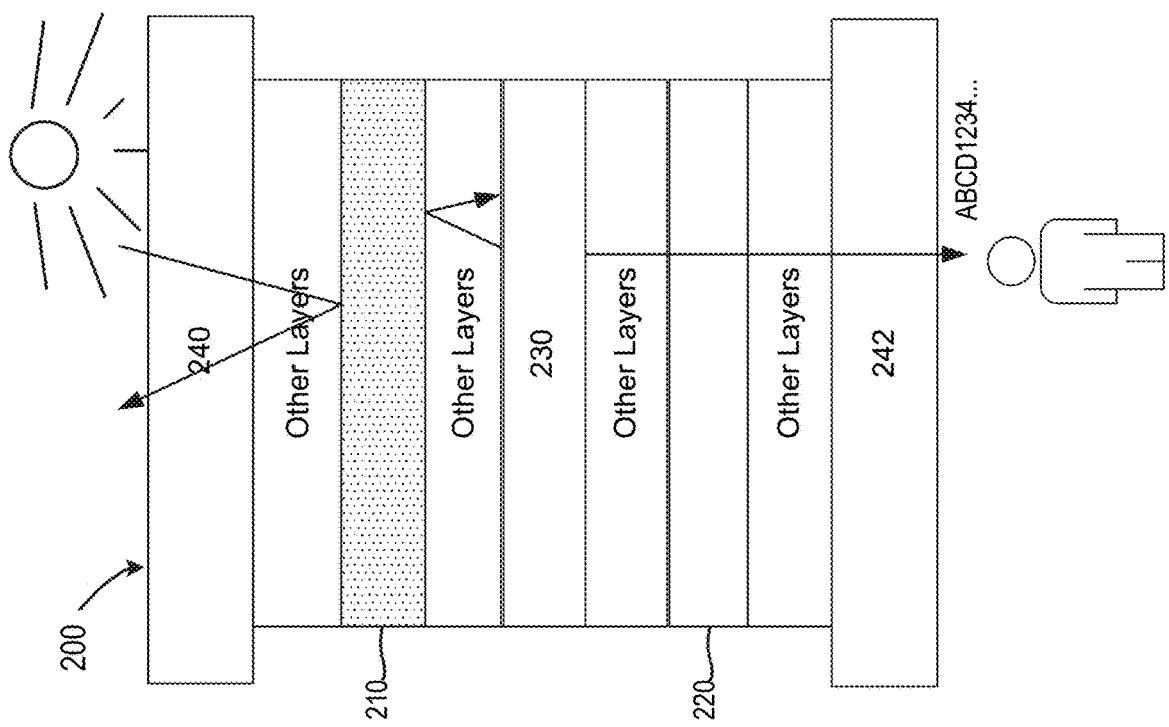
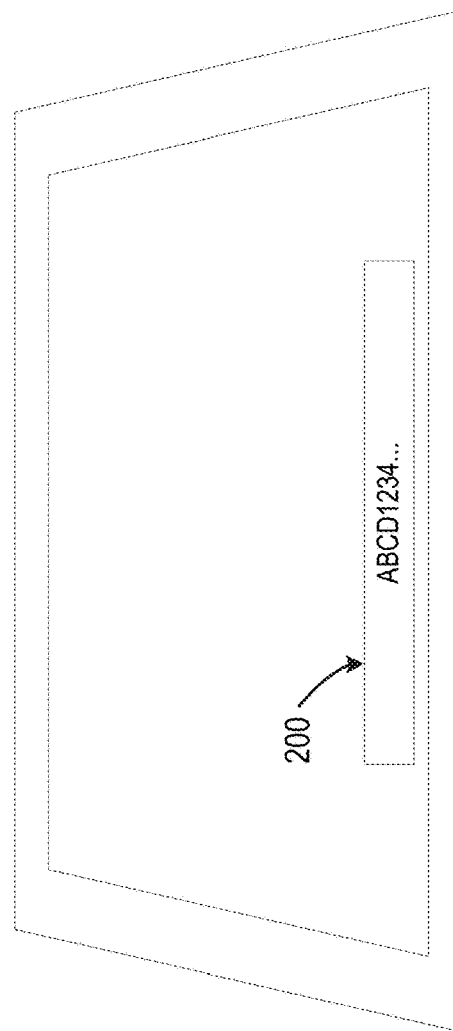
FIG. 7A

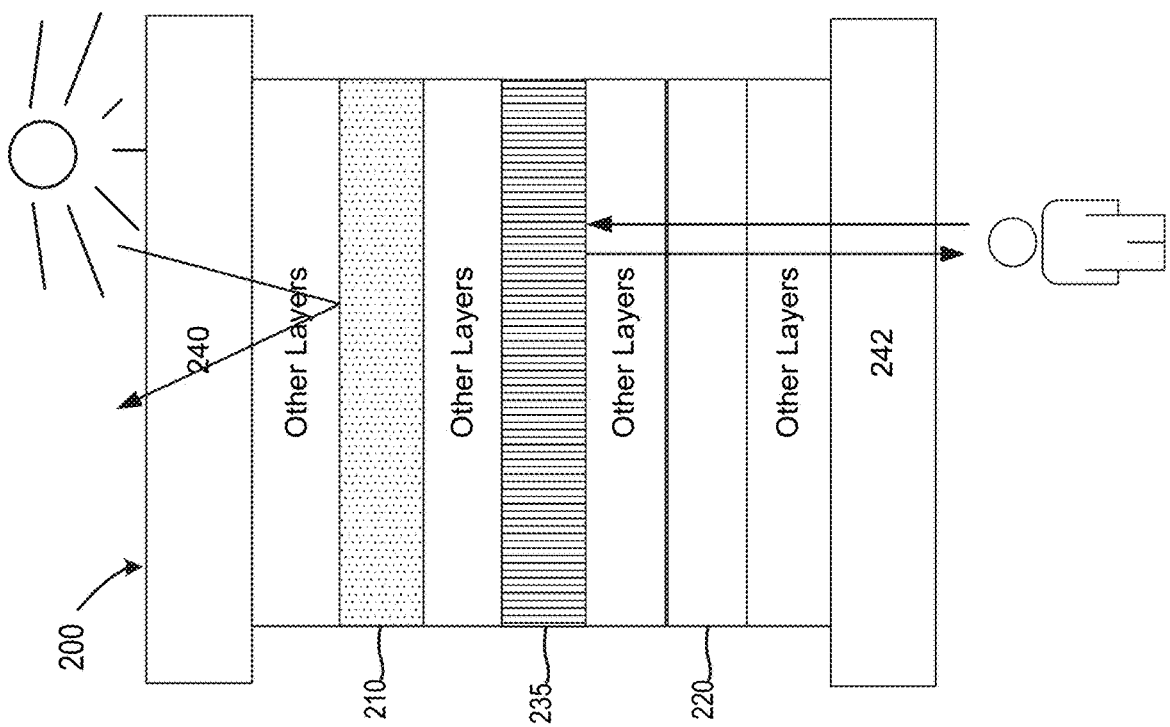
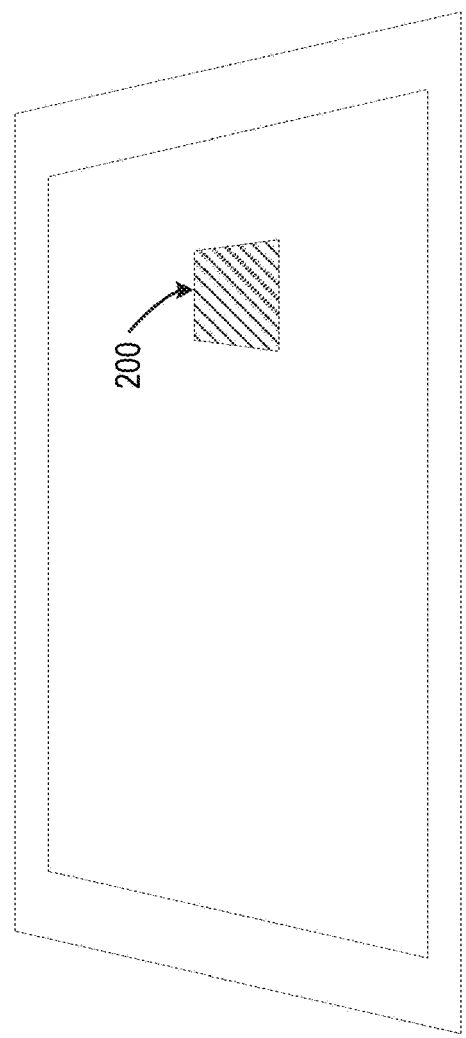
FIG. 8

LIQUID CRYSTAL FILM WINDOW PROVIDING DISPLAY AND DIMMING OPERATIONS

CROSS-REFERENCE TO RELATED APPLICATIONS

This application claims the benefit of U.S. Provisional Application No. 63/122,447, filed Dec. 7, 2020, entitled "MULTI-CELL LIQUID CRYSTAL DISPLAY" which is incorporated herein by reference in its entirety.

BACKGROUND

The present disclosure relates generally to liquid crystal displays (LCDs) and liquid crystal technology for smart glasses, mirror glasses, and electronic displays in vehicles, building, etc.

Dimmable film generally refers to a film having a variable light transmittance. One example of dimmable film is dimmable glass, which can be used to control an intensity of light entering or exiting from a structure. There are many applications for a dimmable glass. For example, a dimmable glass can be used to form a window of an automobile, an aircraft, etc. The light transmittance can be reduced to, for example, protect the passengers from high energy light in a bright environment. The light transmittance can also be increased to, for example, provide the passengers with improved visibility in a dim environment. As another example, a dimmable glass can be used as part of architecture glass of a building. The dimmable glass can perform the function of a blind to, for example, adjust the intensity of light entering a building, to protect privacy, etc.

Because of the variable light transmittance, it is also desirable for the dimmable glass to be incorporated into LCDs to perform functions such as dimmable see-through display.

BRIEF DESCRIPTION OF THE DRAWINGS

Illustrative embodiments are described with reference to the following figures:

FIG. 1A illustrates an example of a dimmable glass, according to embodiments of the present disclosure.

FIG. 4 illustrates an example dimmable LCD operating in a transparent mode according to embodiments of the present disclosure.

FIG. 7A illustrates an example dimmable LCD performing an inside display function according to embodiments of the present disclosure.

FIG. 8 illustrates an example dimmable LCD performing a mirror function according to embodiments of the present disclosure.

Figure 1B:
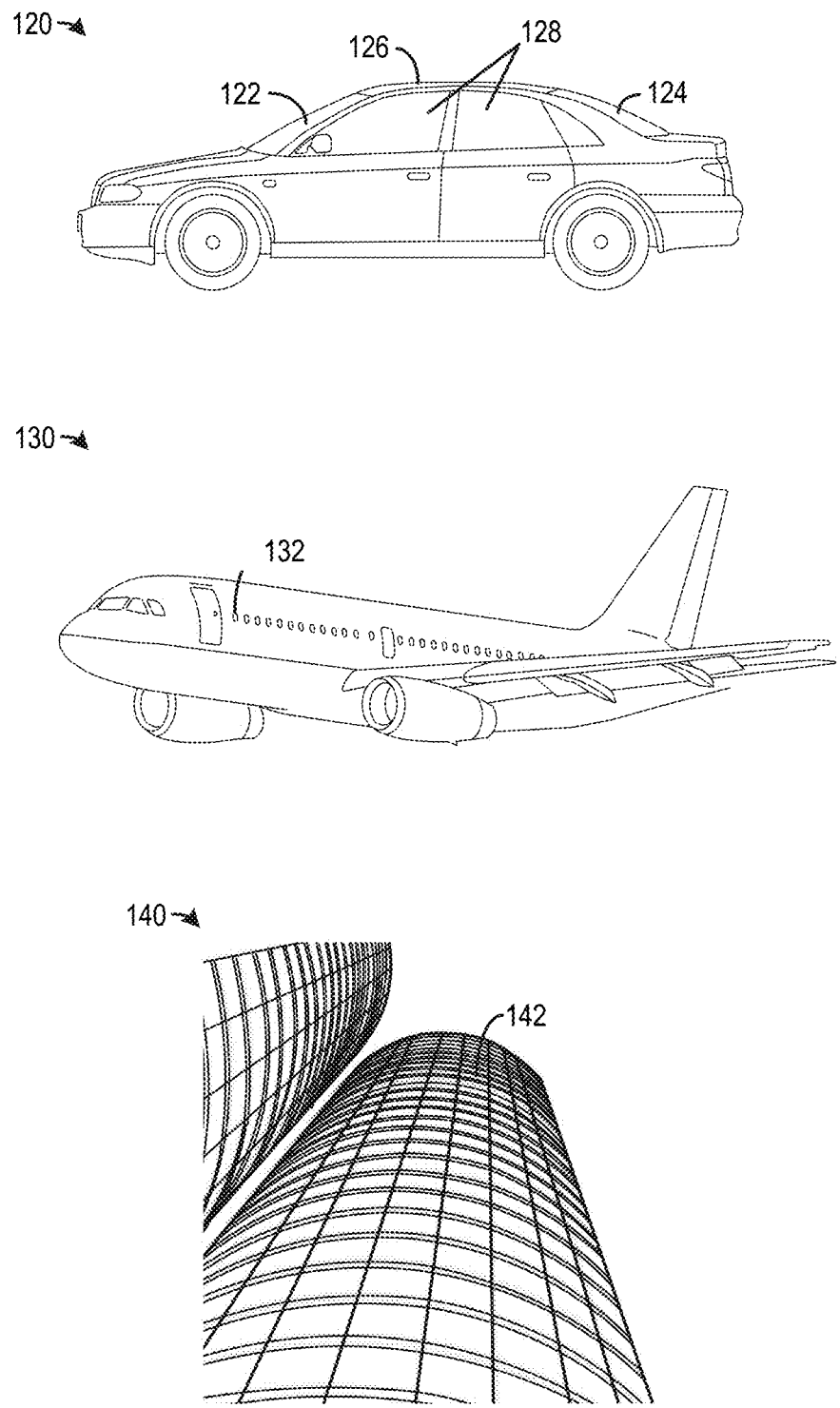
FIG. 1B illustrates example applications of a dimmable LCD, according to embodiments of the present disclosure.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

SUMMARY

The present disclosure relates generally to liquid crystal displays (LCDs) and liquid crystal technologies. The present disclosure also relates generally to dimmable LCDs with a multi-cell structure for increased variable dimming states and improved display or reflective functions.

In some embodiments, a liquid crystal (LC) assembly includes a first curved glass layer and a second curved glass layer. The LC assembly further includes a film-based, flexible LC stack structure between the first curved glass layer and the second curved glass layer. The film-based, flexible LC stack structure includes Guest-Host (GH) liquid crystals. The film-based, flexible LC stack structure is configured to provide both a display operation for displaying content to one or more user and a dimming operation for reducing a transmittance level of light passing through the LC assembly.

In some embodiments, the film-based, flexible LC stack structure includes a plurality of controllable segments, wherein a dimming state of each controllable segment is individually controllable.

In some embodiments, the plurality of controllable segments includes a background segment configured to provide the dimming operation and a plurality of pixel segments configured to provide the display operation by operating a first subset of the plurality of pixel segments in a different dimming state than the background segment.

In some embodiments, the plurality of pixel segments are configured to provide the display operation by operating a second subset of the plurality of pixel segments in a same dimming state as the background segment.

In some embodiments, each controllable segment includes a pair of substrates, and each controllable segment is dimmable using an electrical signal to control an alignment of the GH liquid crystals located between the pair of substrates of the controllable segment.

In some embodiments, each of the plurality of controllable segments is controlled based on a direct drive voltage and/or current.

In some embodiments, the LC assembly a plurality of controllers, each corresponding to a controllable segment, wherein each of the plurality of controllers is configured to generate an electrical signal for controlling an alignment of the GH liquid crystals located between the pair of substrates of the corresponding controllable segment.

In some embodiments, each of the plurality of controllable segments is controlled based on time multiplexing.

In some embodiments, a liquid crystal (LC) assembly includes a first curved glass layer and a second curved glass layer. The LC assembly further includes a film-based, flexible LC stack structure between the first curved glass layer and the second curved glass layer. The film-based, flexible LC stack structure includes twisted nematic (TN) liquid crystals. The film-based, flexible LC stack structure is configured to provide both a display operation for displaying content to one or more user and a dimming operation for reducing a transmittance level of light passing through the LC assembly.

In some embodiments, the film-based, flexible LC stack structure includes a plurality of controllable segments, wherein a dimming state of each controllable segment is individually controllable.

In some embodiments, the plurality of controllable segments includes a background segment configured to provide the dimming operation and a plurality of pixel segments configured to provide the display operation by operating a first subset of the plurality of pixel segments in a different dimming state than the background segment.

In some embodiments, the plurality of pixel segments are configured to provide the display operation by operating a second subset of the plurality of pixel segments in a same dimming state as the background segment.

In some embodiments, each controllable segment includes a pair of substrates, and each controllable segment is dimmable using an electrical signal to control an alignment of the TN liquid crystals located between the pair of substrates of the controllable segment.

In some embodiments, each of the plurality of controllable segments is controlled based on a direct drive voltage and/or current.

In some embodiments, the LC assembly a plurality of controllers, each corresponding to a controllable segment, wherein each of the plurality of controllers is configured to generate an electrical signal for controlling an alignment of the TN liquid crystals located between the pair of substrates of the corresponding controllable segment.

In some embodiments, each of the plurality of controllable segments is controlled based on time multiplexing.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Dimmable glass is a type of glass that can change its light transmission properties when an electrical input (e.g., current or voltage) is applied. The variable light transmittance can be achieved by including a liquid crystal (LC) layer (e.g., a LC cell). A dimmable glass can be used to control an intensity of light transmitted through the glass. For example, a dimmable glass can be used to provide a dimmable windshield of an automobile, a dimmable window of an aircraft, a dimmable architecture glass, etc. to control the light transmitted through the glass in both ways. In addition, dimmable glass can be combined with electronic displays (e.g., liquid crystal displays (LCDs) where information such as images, texts, videos, etc. can be displayed) to provide variable light transmittance feature for achieving improved display. For example, a dimmable LCD (e.g., a smart glass) may have a multi-cell structure where an Organic Light-Emitting Diode (OLED) layer for display and at least one LC layer (e.g., functions as a dimmable glass) configured to control the light transmittance each corresponds to/occupies an individual cell of the multi-cell structure. Accordingly, the dimmable multi-cell LCD can display information and can operate in either a transparent mode or a darkened mode. For another example, a dimmable mirror that includes a controllable mirror layer (e.g., including a two-way mirror) for performing the mirror function may also has the similar multi-cells structure (e.g., including at least one LC layer corresponding to a cell of the multi-cell structure to control the light transmittance). Accordingly, the dimmable multi-cell mirror can have an improved reflectivity when performing the mirror functions (e.g., with a darkened background generated by the LC layer).

The liquid crystal (LC) assembly (e.g., the dimmable LCD) disclosed herein can address the above-mentioned problem by having a multi-cell structure that includes multiple LC layers (e.g., having at least a LC-A layer and a LC-B layer each corresponding to an individual cell of the multi-cell structure). Specifically, besides having the supporting layers (e.g., the safety glasses, polarizers, protective films, compensation films, etc.), the LC assembly may essentially have a three-cell structure where a LC-A layer and a LC-B layer each corresponds to a top cell and a bottom cell respectively. An OLED layer may correspond to a middle cell sandwiched by the LC-A layer and the LC-B layer. By having two LC layers, the LC assembly can achieve more transmittance/dimming states, such as a transparent state (e.g., both LC layers are OFF), a medium darkening/dimming state (e.g., one of the LC-A layer or the LC-B layer is in ON state and the other one is in OFF state), and a full darkening/dimming state (e.g., both of the LC-A and the LC-B layers are in ON state). Moreover, the multi-cell liquid crystal assembly disclosed herein (e.g., having two LC cells disposed on each side of the OLED layer) can achieve an improved display function (e.g., improved see-through display or single-sided display) by controlling the ON and OFF states of each the LC-A and the LC-B layers individually. For example, as will be disclosed in detail below the multi-cell LC assembly can achieve displaying information toward only one side of the structure (e.g., toward the exterior of the structure or the interior of the structure). Specifically, by controlling the LC layer on one side of the OLED layer to be in OFF state while controlling the LC layer on the other side of the OLED layer to be in ON state, the multi-cell LC assembly can achieve a display only for viewer inside the structure or outside the structure. Moreover, when performing a mirror function (e.g., having the OLED layer corresponding to the middle cell replaced by a two-way mirror), the mirror reflectivity can be improved by making the back of the mirror dark (e.g., controlling the LC layer on the reflective light path of the mirror to be in OFF state and controlling the other LC layer on the back of the mirror to be in ON state).

Additionally, the multi-cell LC assembly disclosed herein can occupy designated area(s) of the window to perform different functions. For example, the multi-cell LC assembly can occupy the entire window or only specific area(s) of the window for different display purposes. The multi-cell liquid crystal assembly may also be divided into different segments that are individually dimmable so that a portion of the multi-cell LC assembly surface can be darkened. Also, the multi-cell LC assembly may achieve combination of mirror and display functions by integrating multi-cell LC assemblies with different functions (e.g., one with the display function and one with the mirror function) into one piece of window or by stacking additional layers in addition to the multi-cell LC assembly.

FIG. 1A illustrates an example of a dimmable glass 100 (e.g., an optical device with LC cell(s)). As shown in FIG. 1A, dimmable glass 100 can have a low light transmittance and can have a high light transmittance for different display purposes. When dimmable glass 100 has a low light transmittance, a relatively low proportion of incident light energy is transmitted via dimmable glass 100 as light 102 to a viewer 104, whereas when dimmable glass 100 has a high light transmittance, a relatively high proportion of incident light energy is transmitted as light 106 to viewer 104. The light transmittance can be controlled by a controller (hardware and/or software based), a sensor that senses the ambient light intensity, manually by a switch, or by any combination thereof. Besides light transmittance, dimmable glass 100 may also alter other properties of the light based on, for example, scattering the transmitted light (e.g., to create haze or a translucent appearance), controlling a wavelength of the transmitted light (e.g., to change the color of the light), etc.

Dimmable glass 100 can be used in various applications to provide a dimming solution. For example, dimmable glass 100 may be combined with an integral electronic display (e.g., an LCD that includes an OLED layer suitable for display content/information) to form a dimmable LCD for achieving see-through display (e.g., allows the user to see what is shown on the dimmable LCD while still being able to see through the dimmable LCD) and/or single-sided display functions (e.g., displaying content/information toward only the inside or the outside of a structure) in addition to basic functions of dimmable glass 100 such as the light transmittance/dimming control function. For examples, FIG. 1B illustrates examples of applications of a dimmable LCD according to certain embodiments. As shown in FIG. 1B, the dimmable LCD can be included in one or more windows of an automobile 120 including, for example, windshields 122 and 124, sunroof 126, and side windows 128. The dimmable LCD can also be included in portholes of an aircraft 130 (e.g., porthole 132), as well as the architecture glasses of a building 140 (e.g., exterior glass 142).

Embodiments of the present disclosure are directed to dimmable LCDs for use in vehicular environments. For example, the dimmable LCD architectures disclosed herein can be used as windshields of vehicles. It is understood that, the scope of the present disclosure is not limited to vehicles, and the embodiments can be used for other applications such as architectural windows (e.g., a window of a building).

Figure 2A:
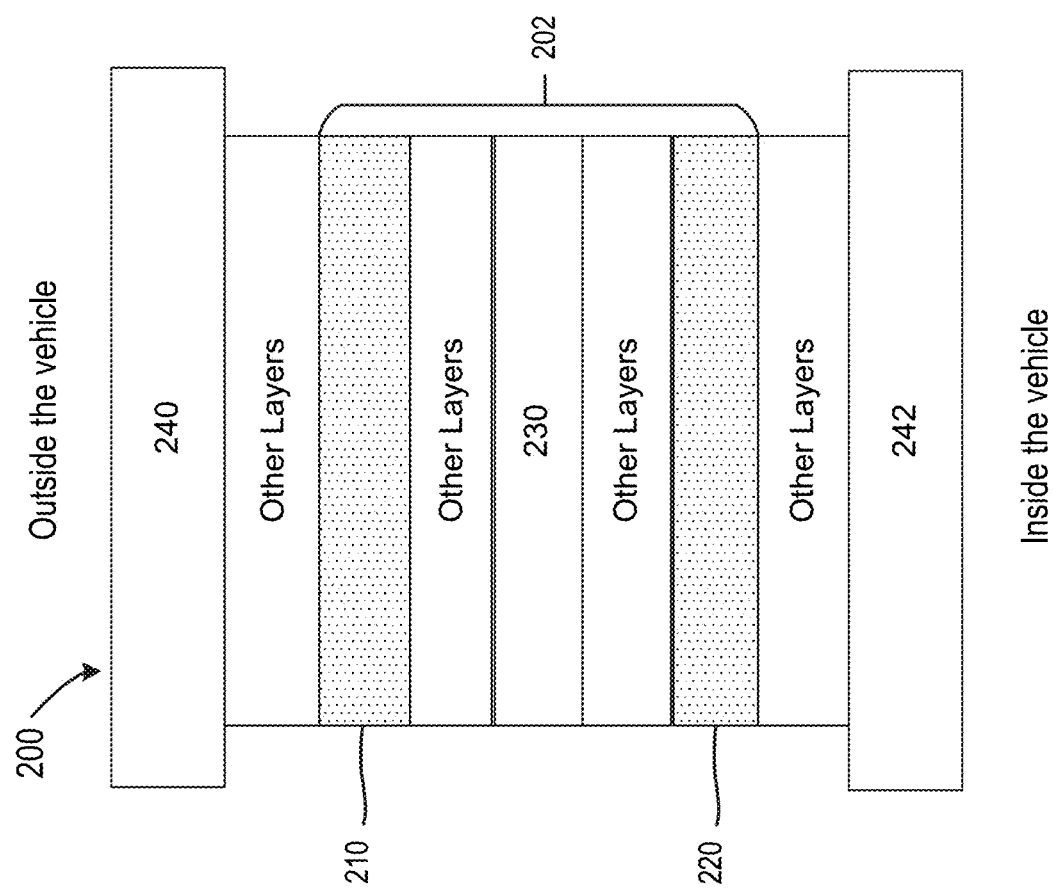
FIGS. 2A and 2B illustrate schematic diagrams of example dimmable LCD structures according to embodiments of the present disclosure.
Figure 2B:
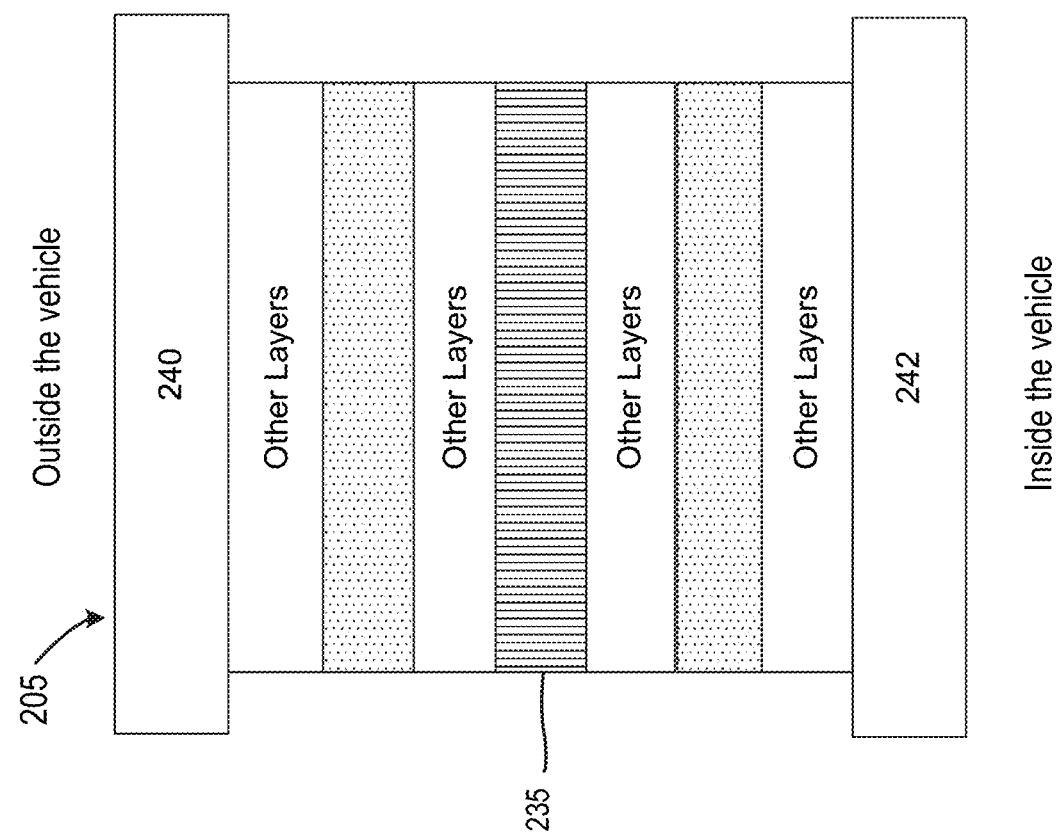

FIG. 2A illustrate an example dimmable LCD 200 configured to perform display functions and FIG. 2B illustrate an example dimmable LCD 205 configured to perform mirror functions, according to certain embodiments. Dimmable LCD 205 along with FIG. 2B will be described in later sections. In some embodiments, dimmable LCD 200 may include a three-cell structure 202 disposed between safety glass layers 240 and 242 that are configured to provide protection and mechanical support to dimmable LCD 200. Three-cell structure 202 includes two liquid crystal layers (LC-A 210 and LC-B 220) and an OLED layer 230 disposed between LC-A 210 and LC-B 220. Specifically, LC-A 210, LC-B 220, and OLED layer 230 each corresponds to an individual cell of three-cell structure 202. As shown in FIG. 2A, LC-A 210 and LC-B 220 may correspond to a top cell (e.g., the cell closest to the exterior of the vehicle) and a bottom cell (e.g., the cell closest to the interior of the vehicle) respectively. OLED layer 230 may correspond to a middle cell (e.g., the cell sandwiched by the top cell and the bottom cell) disposed in the middle of three-cell structure 202. LC-A 210 and LC-B 220 may be configured to provide adjustable light transmittance/dimming and OLED layer 230 may be configured to display content/information such as graphical information, texts, and/or videos. As will be disclosed in detail below, dimmable LCD 200 may operate in different modes (e.g., a transparent mode, a medium darkening/dimming mode, a full darkening/dimming mode, etc.) defined by a dimming state of LC-A 210 and LC-B 220.

In some embodiments, dimmable LCD 200 may further include a controller/processor (hardware and/or software based, not shown), configured to generate electrical signals usable for controlling the dimming state of LC-A 210 and/or LC-B 220. For example, as will be disclosed in detail below, the controller/processor may be configured to generate the electrical field for controlling the alignment of liquid crystals in LC-A 210 and/or LC-B 220 (e.g., liquid crystals located between the pair of substrates of LC-A 210 and/or LC-B 220). Moreover, the controller may further be configured to select an operating mode from among a plurality of operating modes (e.g., a transparent mode, a medium darkening/dimming mode, and a full darkening/dimming mode), by controlling/defining a dimming state of LC-A 210 and/or LC-B 220.

In some embodiments, the controller may comprise one or more circuits implemented on a printed circuit board (PCB), a dedicated semiconductor device, an application-specific instruction set processor (ASIP), and/or other types of devices used specifically for controlling the dimming state of LC-A 210 and/or LC-B 220. In some other embodiments, the controller/processor may also be a general-purpose processor shared with other applications. In some embodiments, the controller/processor can be an integral part of dimmable LCD 200 or the controller can be a device located outside dimmable LCD 200.

As shown in FIG. 2A, additional layers (e.g., other layers in FIG. 2A) may be disposed between three-cell structure 202 and safety glass layers 240 and 242. The additional layers may also be disposed within three-cell structure 202, separating LC-A 210, LC-B 220, and OLED layer 230. In some embodiments, the additional layers may be provided to support the operation of LC-A 210, LC-B 220, and OLED layer 230. Examples of such additional layers may include but not limited to polarizers, protective films, compensation films (e.g. triacetate, TAC), conductive layers (e.g. indium tin oxide, ITO), adhesives (e.g. optically clear adhesive, OCA), thin film transistor layers (TFT), etc. These additional layers may also include layers that are used for another function, e.g. a layer for ultraviolet (UV) or infrared protection.

Figure 3A:
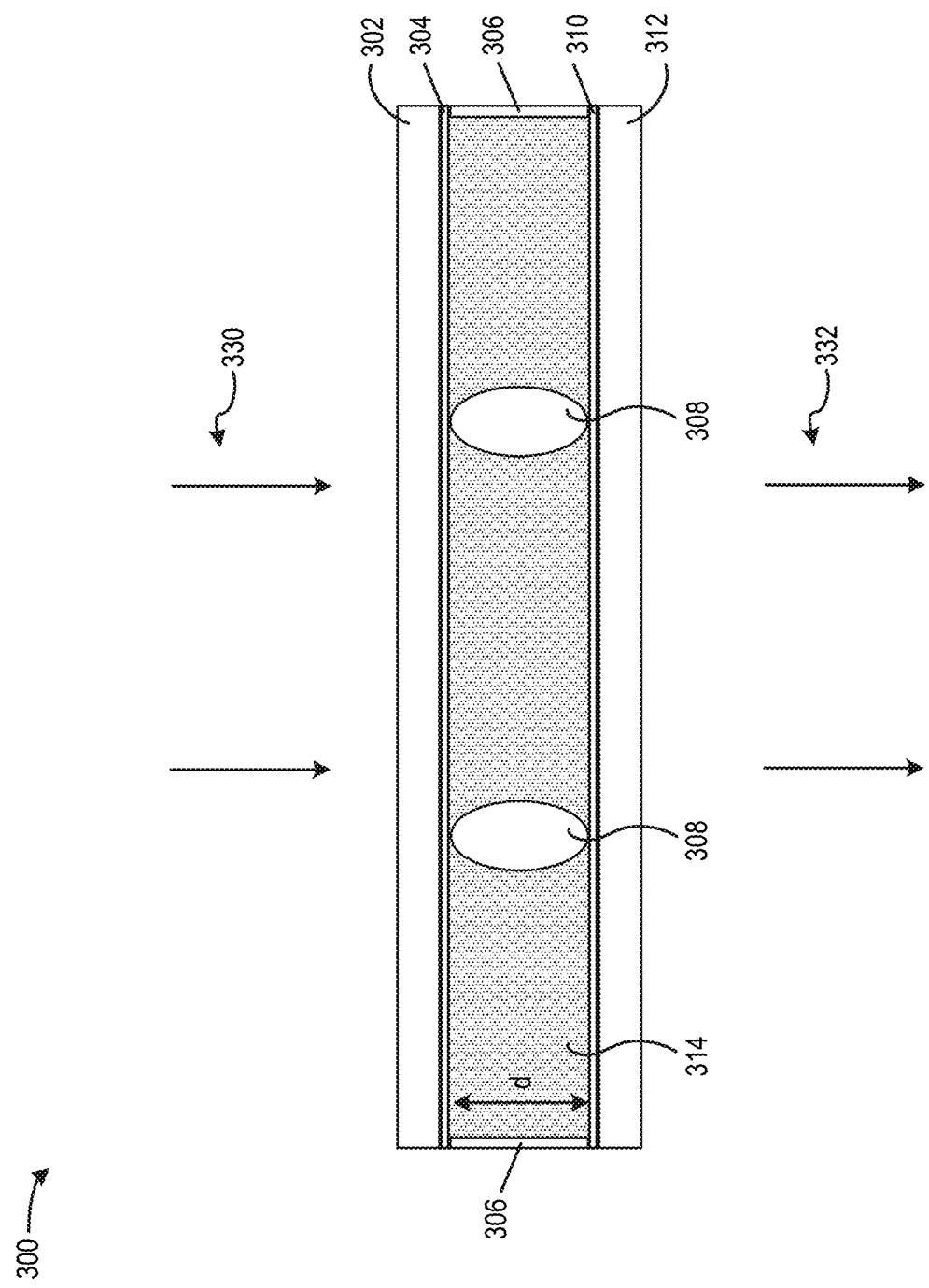
FIG. 3A-FIG. 3C illustrate an example of a liquid crystal cell and its operations according to embodiments of the present disclosure.
Figure 3B:
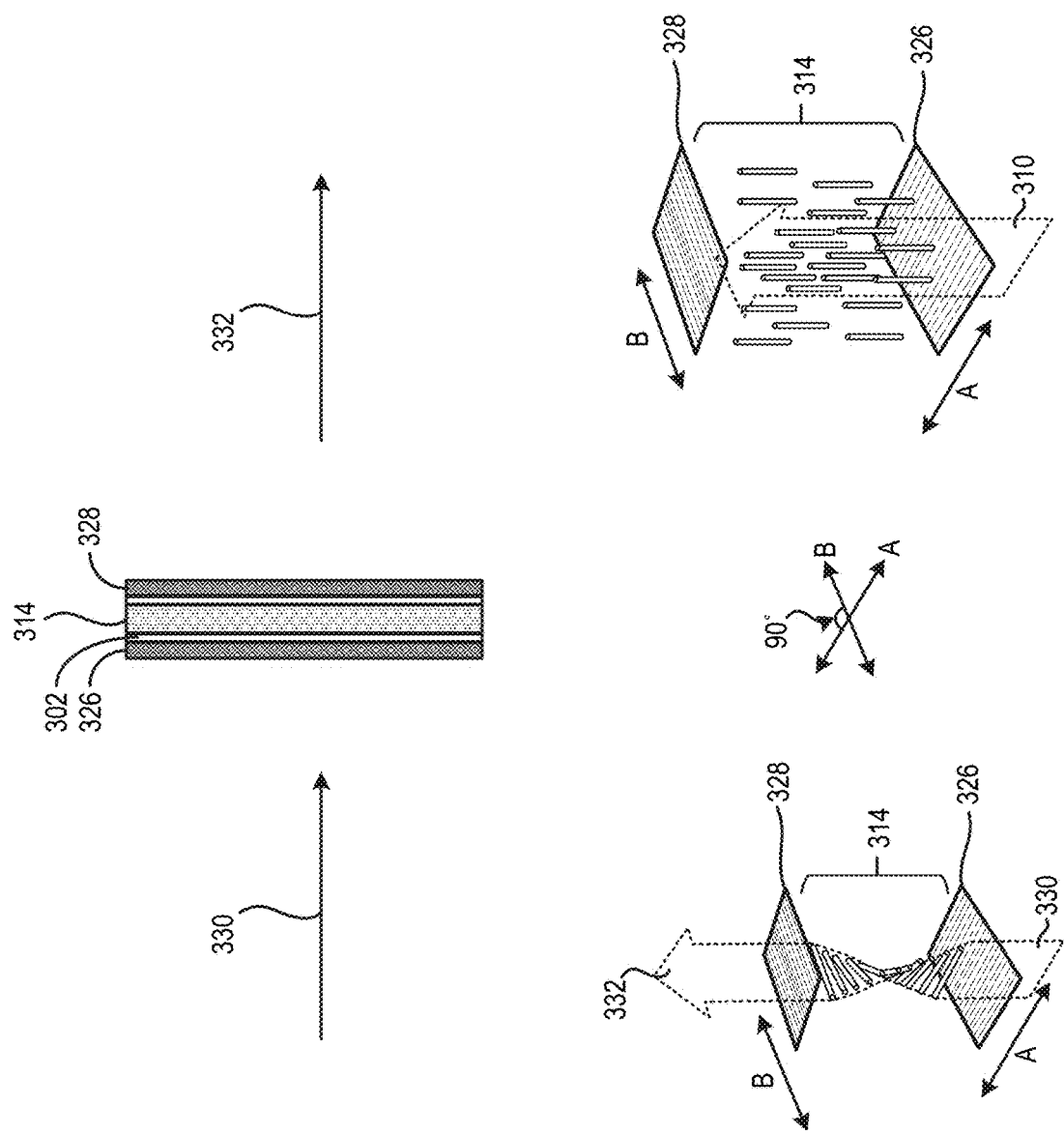
Figure 3C:
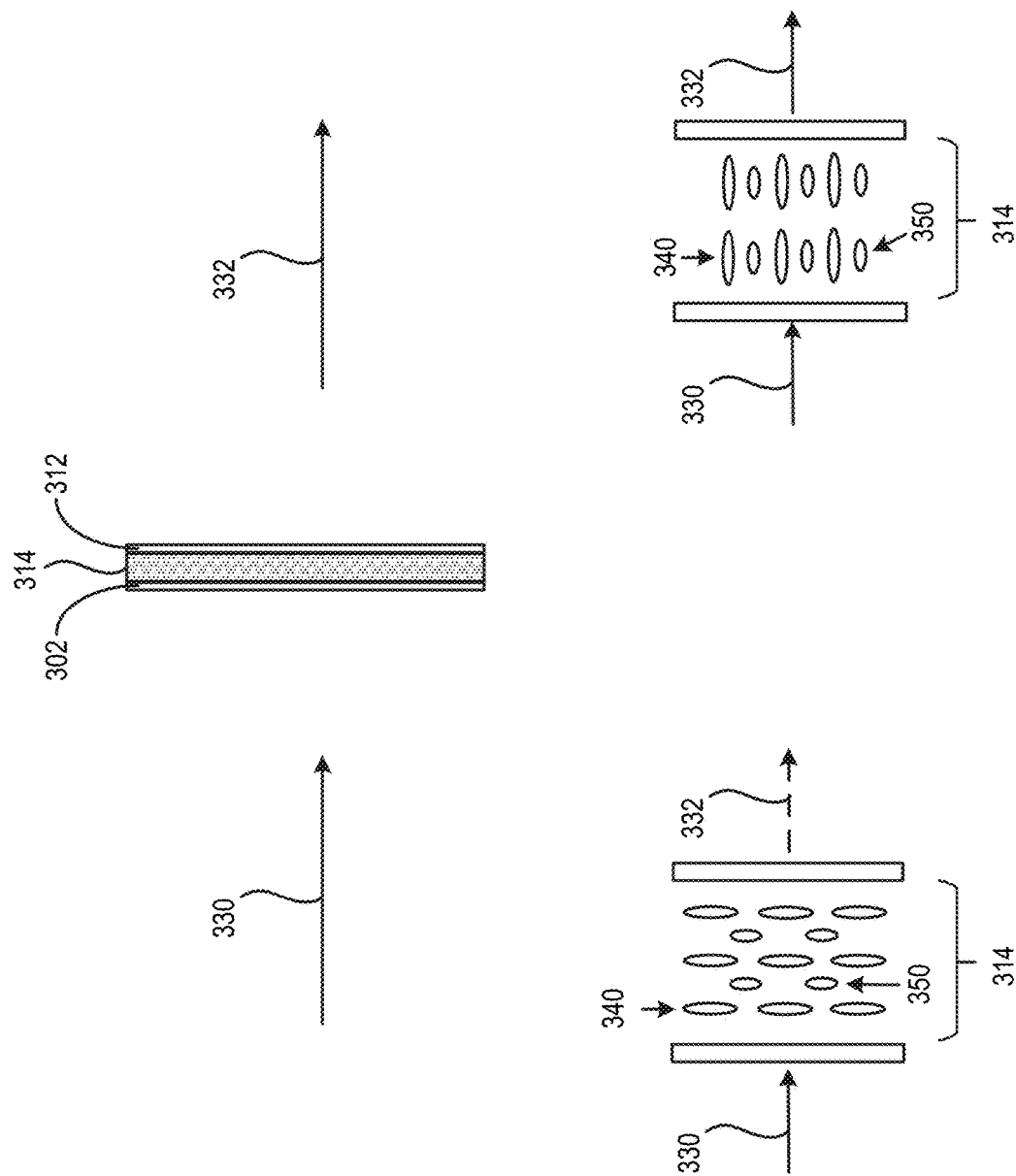

In some embodiments, two liquid crystal layers LC-A 210 and LC-B 220 may include any types of liquid crystal cells, such as vertical alignment (VA) crystal cells, twisted nematic (TN) crystal cells, guest host (GH) crystal cells, or any combination thereof, that can provide variable light transmittance. For example, FIG. 3A-3C illustrate examples of a liquid crystal cell 300 and its operations according to certain embodiments. Liquid crystal cell 300 may be liquid crystal layers LC-A 210 and LC-B 220. As shown in FIG. 3A, liquid crystal cell 300 includes a first substrate 302, a first polyamide (PI) layer 304, sealant 306, spacers 308, second PI layer 310, a second substrate 312, and a liquid crystal 314. Sealant 306 can define a base area liquid crystal cell, with the cell space between first substrate 302 and second substrate 312 to be filled up by liquid crystal 314 to form the liquid crystal cell. Moreover, spacers 308 can provide structural support between first substrate 302 and second substrate 312 to maintain a cell gap distance d between the substrates. First substrate 302 and second substrate 312 can be made of transparent materials to let incoming light 330 propagate through liquid crystal 314 to become outgoing light 332. First substrate 302 and second substrate 312 can be made of materials such as glass, or a flexible material such as polycarbonate (PC), polyethylene terephthalate (PET), or cellulose triacetate (TAC), which allows liquid crystal cell 300 to conform to a curved surface such as a windshield, a curved architecture glass panel, etc. Spacers 308 can include, for example, silica gel balls, plastic balls, etc., and can be coated with a black coating to reduce light transmission. Adhesion between spacers 308 and each of first PI layer 304 and second PI layer 310 can be formed after a high temperature baking process.

Moreover, first PI layer 304 and second PI layer 310 can include rubbing patterns to align liquid crystal molecules of liquid crystal 314 in a default orientation, which can set an initial/default state of light transmittance of liquid crystal cell 300. First substrate 302 and second substrate 312 are also coated with an electrical conductive material (e.g., Indium tin oxide (ITO)) to conduct a voltage, which can lead to an electric field being applied across liquid crystal 314 to change the orientations of the liquid crystal molecules from their default orientations set by the PI layers. As to be described below, the orientations of the liquid crystal molecules of liquid crystal 314 can adjust the overall light transmittance of liquid crystal cell 300 and the intensity of outgoing light 332 exiting from the device. Accordingly, by controlling the electric signal applied across liquid crystal 314 (e.g., applied between first substrate 302 and second substrate 312), liquid crystal cell 300 may achieve OFF state (e.g., transmit most of the incident light), ON state (e.g., block most of the incident light), and/or intermediate states (i.e., non-binary switching between ON and OFF states) inn a normally-white configuration. It is understood that not all components of liquid crystal cell 300 are shown in FIGS. 3A-3C and some of the components (e.g., sealant 306 and/or spacers 308) shown in FIGS. 3A-3C may not be necessary for liquid crystal cell 300 to operate.

FIG. 3B illustrates one example configuration of liquid crystal 314 to provide adjustable light transmittance. As shown in FIG. 3B, liquid crystal 314 can be configured as a twisted nematic (TN) liquid crystal. The liquid crystal molecules can be aligned by first PI layer 304 and second PI layer 310 to have a twisted configuration to form a helical structure. The helical structure can rotate the polarization axis of polarized light as the polarized light traverses the liquid crystal layer, with the angle of rotation adjustable by an electric signal (e.g., an electric field) applied by a driver circuit across the liquid crystal layer. For example, as shown in FIG. 3B, if no electric field is applied, the liquid crystal molecules can be aligned by first PI layer 304 and second PI layer 310 to have a twisted configuration to form a helical structure. The helical structure causes the polarization axis of the polarized light to rotate by a certain angle (e.g., a 90 degree angle), which can be set by the alignment angles of the PI layers, as the polarized light traverses through the liquid crystal layer. Moreover, if an electric field is applied, the liquid crystal molecules may align in parallel with the electric field. The polarization axis of the polarized light can be maintained and not rotated as the light traverses the aligned liquid crystal molecules.

Liquid crystal 314, as well as first substrate 302 and second substrate 312, can be sandwiched between a first polarizer layer 326 and a second polarizer layer 328. In a normally-white configuration, first polarizer layer 326 can have a polarization axis A, whereas second polarizer layer 328 can have a polarization axis B. The two polarization axes can form a 90-degree angle with respect to each other. Incoming light 330 can become linearly polarized by first polarizer layer 326. The linearly polarized light can be rotated by liquid crystal 314 by an angle configured by the nematic structure as described above. Maximum light transmittance can be achieved in a case where no electric field is applied (e.g., in OFF state), such that liquid crystal 314 rotates the polarization axis of the polarized light such that it aligns with the polarization axis B of second polarizer layer 328. Minimum light transmittance can be achieved when the polarization axis of the polarized right is not rotated due to application of an electric field, such that the polarization axis of the polarized light is not rotated and becomes perpendicular to the polarization axis B of second polarizer layer 328. In such a case, the polarized light aligns with the absorption axis of second polarizer layer 328 and can be absorbed by second polarizer layer 328 at a maximum absorption rate (e.g., in ON state). The electric field magnitude can be adjusted to adjust the angle of rotation of the polarized light, which can vary the portion of incoming light 330 that passes through liquid crystal 314 as outgoing light 332. A typical range of light transmittance achievable by TN liquid crystal can be between 0.5% to 36%.

FIG. 3C illustrates another example configuration of liquid crystal 314 to provide adjustable light transmittance. As shown in FIG. 3C, liquid crystal cell 300 includes liquid crystal 314 but not first and second polarizer layers 326 and 328. Liquid crystal 314 can be configured as a Guest-Host (GH) liquid crystal including liquid crystal molecules 340, which act as a host, and dye molecules 350, which act as a guest. Liquid crystal molecules 340 and dye molecules 350 can modulate the light transmittance based on Guest-Host effect. Specifically, depending on the type of dye molecules 350, dye molecules 350 can absorb light having an electric field that is parallel to the long axis of the dye molecules.

The PI layers on first substrate 302 and second substrate 312 can have anti-parallel rubbing directions to set the initial orientation of the liquid crystal molecules and dye molecules based on an operation mode of liquid crystal cell 300. In a normally white mode where a liquid crystal cell is in a transparent state when no electric field is applied, the PI layers can have rubbing directions configured such that the long axis of the dye molecules is parallel with incoming light 330 (e.g., perpendicular to the electric field of incoming light 330), and the absorption of light by the dye molecules can be set at the minimum. When the driver circuit applies an electric field across liquid crystal molecules 340, the orientation of liquid crystal molecules 340, as well as dye molecules 350, can be changed according to the electric field, which changes the relative orientation of the dye molecules with respect to the electric field of incoming light 330. As a result, the portion of incident light 330 absorbed by dye molecules 350, and the light transmittance of liquid crystal cell 300, can be adjusted by the electric field applied across liquid crystal 314. On the other hand, in a normally dark mode, the PI layers can have rubbing directions configured such that the long axis of the dye molecules is perpendicular to incoming light 330 (e.g., parallel to the electric field of incoming light 330), which leads to maximum absorption of light 330 by the dye molecules. The absorption can be reduced by changing the orientation of the dye molecules when an electric field is applied across the liquid crystal.

It is understood that the liquid crystals disclosed herein are for illustrative purposes only and not intended to limit the scope of the specification. Any suitable types of liquid crystal can be used for LC-A 210 and LC-B 220 to provide adjustable light transmittance. The operations of dimmable LCD 200/205 disclosed hereinafter depends on the assumption that the configurations of LC-A 210 and LC-B 220 are "normally white LCs", meaning that LC-A 210 and LC-B 220 will be transparent (e.g., let light pass through) when no electric field applied (e.g., will be transparent in OFF state). It is understood that LC-A 210 and LC-B 220 may also be "normally black LCs" where LC-A 210 and LC-B 220 will be dimmed (e.g., block at least a portion of the light) when no electric field applied (e.g., will be transparent in OFF state), and the operation of dimmable LCD 200/205 may be adjusted accordingly. A person skilled in the art can figure out the corresponding adjustments to the operations without undue experiments based on the principles disclosed herein. Accordingly, the corresponding adjusted operations will not be described in detail for ease of illustration.

Referring back to FIG. 2A, OLED layer 230 may include a film of organic compound that emits light in response to an electric current (e.g., functions as an emissive electroluminescent layer). OLED layer 230 may be transparent when no electric signal is applied (e.g., is transparent when not displaying). OLED layer 230 may be small molecules-based OLED or polymers-based OLED. OLED layer 230 may be driven with a passive-matrix (PMOLED) control scheme (e.g., where each row/line in the display is controlled sequentially, one by one) or active-matrix (AMOLED) control scheme (e.g., where a thin-film transistor (TFT) backplane is used to directly access and switch each individual pixel ON or OFF), depending on the resolution and/or the size requirements of the display. In some embodiments, the ON and OFF of OLED layer 230 (e.g., whether OLED layer 230 displays information) may be controlled by the same controller/processor controlling the dimming state of LC-A 210 and LC-B 220. In some other embodiments, the ON and OFF of OLED layer 230 may be controlled by a controller/processor different from the controller/processor controlling the dimming state of LC-A 210 and LC-B 220.

In some embodiments, when used as windshields for vehicles (e.g., an automobile, an airplane, a boat, etc.) or exterior windows for a architecture, safety glass layers 240 and 242 may be transparent safety glasses that has additional features making it less likely to break, or less likely to pose a threat when broken to provide better support and protection to dimmable LCD 200. For example, safety glass layers 240 and 242 may be any of the toughened glass (also known as tempered glass), the laminated glass, the wire mesh glass, or any of the combination thereof.

Figure 5:
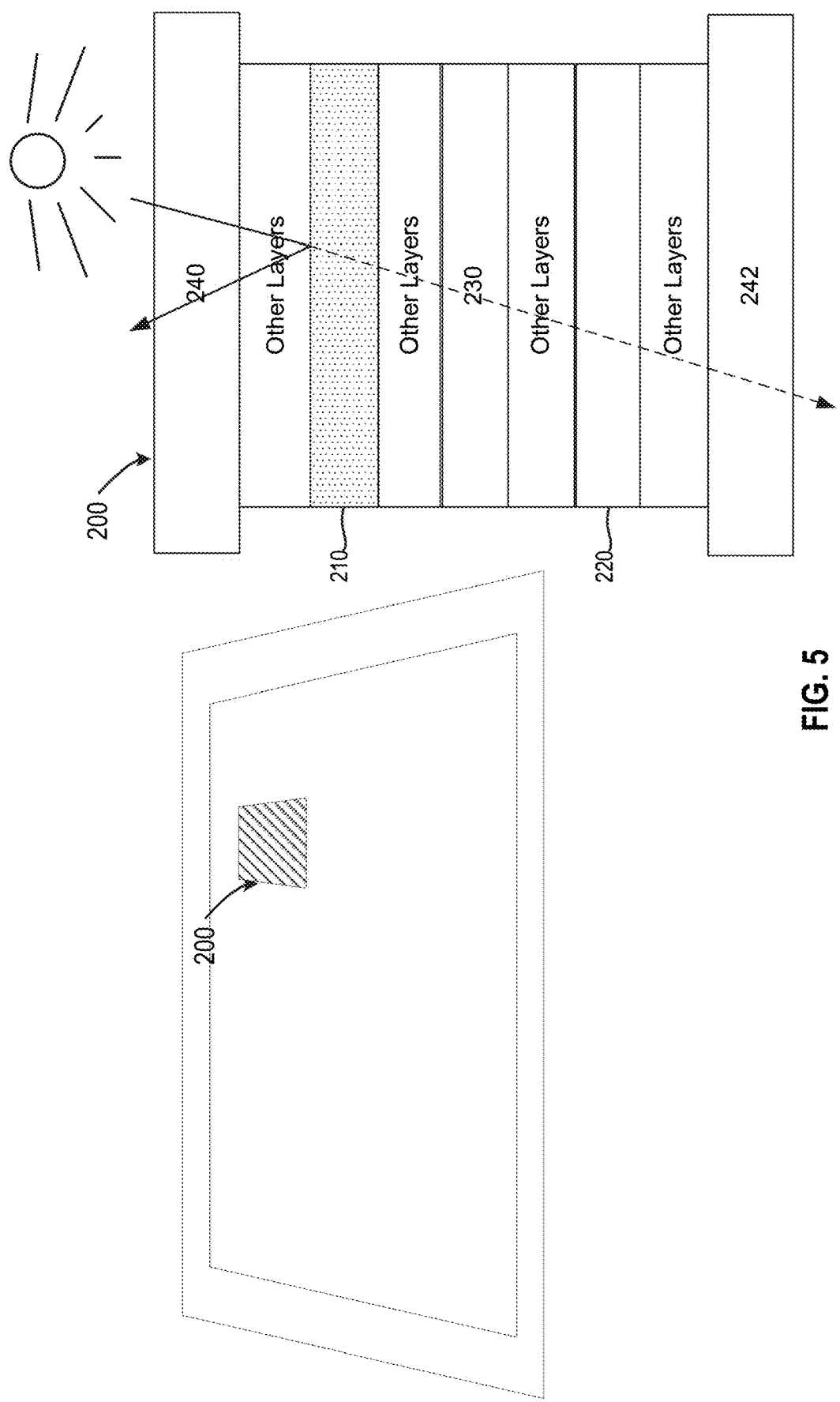
FIG. 5 illustrates an example dimmable LCD operating in a medium darkening/dimming mode according to embodiments of the present disclosure.
Figure 6:
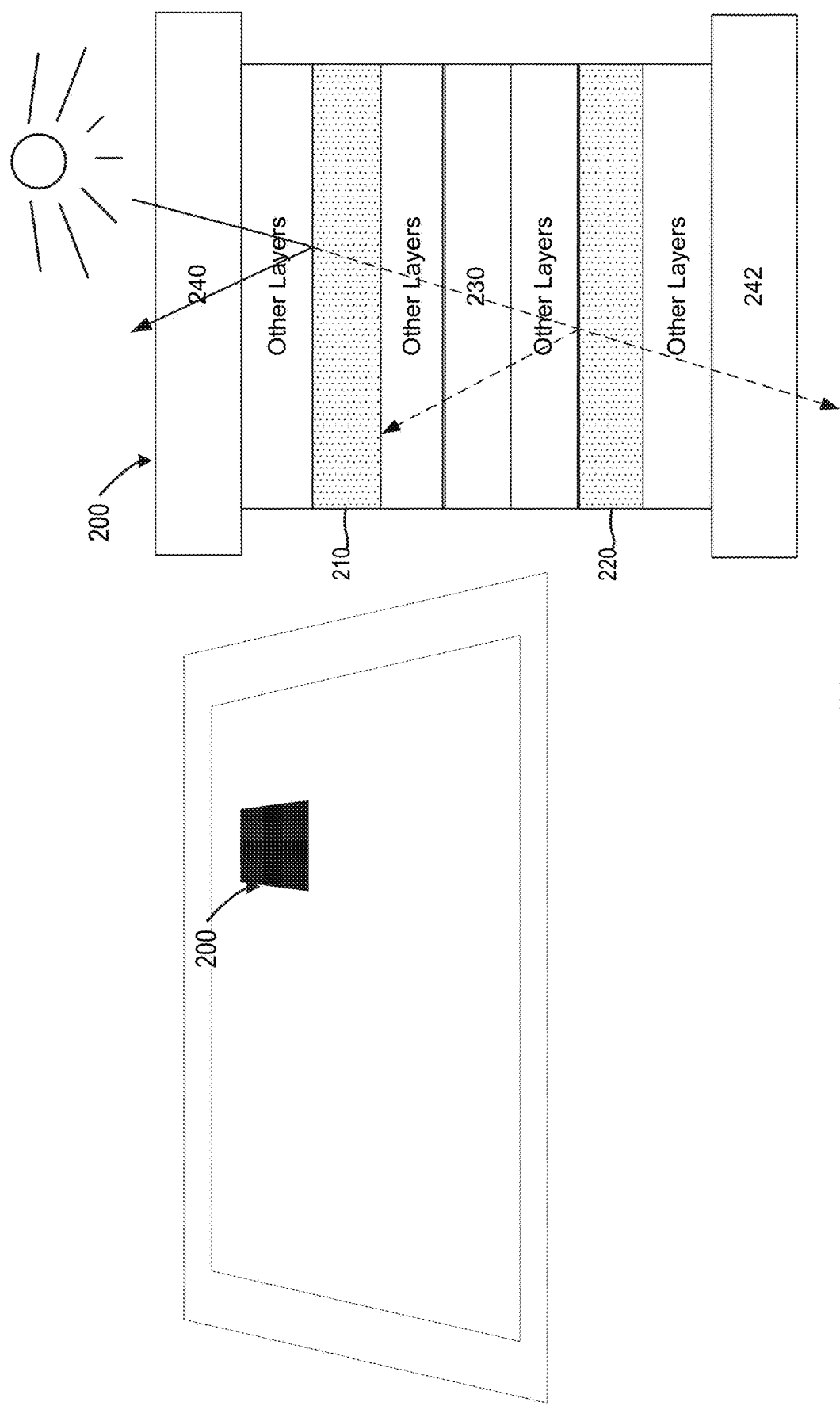
FIG. 6 illustrates an example dimmable LCD operating in a full darkening/dimming mode according to embodiments of the present disclosure.

With the multi-cell structure, when OLED layer 230 is not displaying information (e.g., is in OFF state), dimmable LCD 200 is operable in different dimming modes similar to a dimming glass, depending on a dimming state of LC-A 210 and LC-B 220. FIGS. 4-6 illustrates examples of dimmable LCD 200 configured to operate in different modes according to certain embodiments. For example, FIG. 4 illustrates an example of dimmable LCD 200 configured to operate in a transparent mode according to certain embodiments. Specifically, dimmable LCD 200 may operate in the transparent mode when both LC-A 210 and LC-B 220 are in OFF state (e.g., permitting light to travel through both of the LC layers). As shown in FIG. 4, light from an external light source (e.g., sunlight) that is incident upon an outermost, exterior surface of dimmable LCD 200 (e.g., the outermost surface of safety glass layers 240) is able to travel through the various layers of dimmable LCD 200 to exit an opposing, the innermost surface of dimmable LCD 200 (e.g., the innermost surface of safety glass 242). Accordingly, dimmable LCD 200 appears transparent (e.g., most of incident light passes through dimmable LCD 200 from the outside to the inside) when operating in the transparent mode.

For another example, FIG. 5 illustrates an example of dimmable LCD 200 configured to operate in a medium darkening/dimming mode according to certain embodiments. Specifically, the medium darkening/dimming mode may be achieved when one of LC-A 210 or LC-B 220 is in OFF state (e.g., permitting light to travel through the LC layer), and the other one is in ON state (e.g., blocking at least a portion of light incident upon the LC layer). For example, as shown in FIG. 5, dimmable LCD 200 operates in the medium darkening/dimming mode when LC-A 210 is in ON state and LC-B 220 is in OFF state. Accordingly, LC-A 210 blocks at least a portion of light from an external light source (e.g., sunlight) that is incident upon an outermost, exterior surface of LC-A 210 (e.g., the surface of LC-A 210 opposite to OLED layer 230) while allows a part of the light to pass through LC-A 210. LC-B 220 allows light incident on LC-B 220 (e.g., the part of the light passes through LC-A 210) to pass through. Accordingly, dimmable LCD 200 appears a medium degree of dimming (e.g., a portion of incident light passes through dimmable LCD 200 from the outside to the inside) when operating in the medium darkening/dimming mode.

For a further example, FIG. 6 illustrates an example of dimmable LCD 200 configured to operate in a full darkening/dimming mode according to certain embodiments. Specifically, the full darkening/dimming mode may be achieved when both LC-A 210 and LC-B 220 are in ON state (e.g., blocking at least a portion of light incident upon both of the LC layers). Accordingly, both LC-A 210 and LC-B 220 block at least a portion of light from an external light source (e.g., sunlight) that is incident upon an the LC layer (e.g., incident upon the surface of LC-A 210 opposite to OLED layer 230 and the surface of LC-B 220 close to OLED layer 230) while allows a part of the light to pass through the LC layer. Compared with the configuration of FIG. 5 (e.g., LCD structure 200 operates in the medium darkening/dimming mode), a greater degree of dimming/darkening is achieved. However, as illustrated in FIG. 6, some amount of light incident on the outermost surface of dimmable LCD 200 may still be permitted to pass through LC-B 220 to exit an opposing, namely the innermost surface of dimmable LCD 200. This could avoid the inside of the vehicle to be in a complete darkness.

Accordingly, dimmable LCD 200 can operate in more states (e.g., a transparent mode, a medium darkening/dimming mode, and a full darkening/dimming mode) compared with conventional dimmable LCDs which have only two states with their respective light transmittance level (e.g., OFF state with 30% light transmittance and ON state with 1% light transmittance). This could greatly increase the adaptability of the dimmable LCD in different ambient light conditions. Table 1 summarizes how operating modes of dimmable LCD 200 is controlled by dimming state of LC-A 210 and LC-B 220.

TABLE 1

| LC-A | OLED | LC-B | Operating mode |
|------|------|------|----------------|
| off  | off  | off  | Transparent    |
| off  | off  | on   | Medium darkening |
| on   | off  | off  | Medium darkening |
| on   | off  | on   | Fully darkening |

Moreover, when OLED layer 230 is ON (e.g., displaying content/information) dimmable LCD 200 can perform single-sided display function (e.g., the displayed content/information that is viewable only to viewers inside or outside the vehicle) by controlling the dimming state of LC-A 210 and LC-B 220. For example, FIG. 7A illustrates an example of dimmable LCD 200 configured to operate in an inside display function according to certain embodiments. As shown in FIG. 7A, the inside display function can be achieved when OLED layer 230 displays content/information (e.g., text, logos, or other graphical information) while LC-A 210 is in ON state (e.g., blocks at least a portion of incident light) and LC-B 220 is in OFF state. Specifically, as illustrated in FIG. 7A, LC-A 210 may block light incident from both side (e.g., from an external light source and from OLED layer 230). When LC-A 210 blocks light incident from external light (e.g., incident from an external light source), OLED layer 230 may have a darkened background and thus improve the quality of the display. Moreover, when LC-A 210 blocks light incident from OLED layer 230, the content/information displayed by OLED layer 230 would not be viewable from the exterior of the vehicle. Accordingly, when operating in the inside display function, the displayed content/information is directed toward the inside (facing the inside viewer and away from the external light source). For example, the viewer may be a person seated in the interior cabin of a vehicle such as an automobile, an airplane, a boat, etc. This could provide better privacy to the user inside the vehicle.

In some embodiments, information displayed by OLED layer 230 may also be dimmed by LC-B 220 when dimmable LCD 200 performs the inside display function (e.g., perform a dimmed inside display function). For example, dimmed inside display function can be achieved when OLED layer 230 is ON (e.g., displaying information), and when LC-A 210 and LC-B 220 are both in ON state (e.g., block at least a portion of incident light).

Figure 7B:
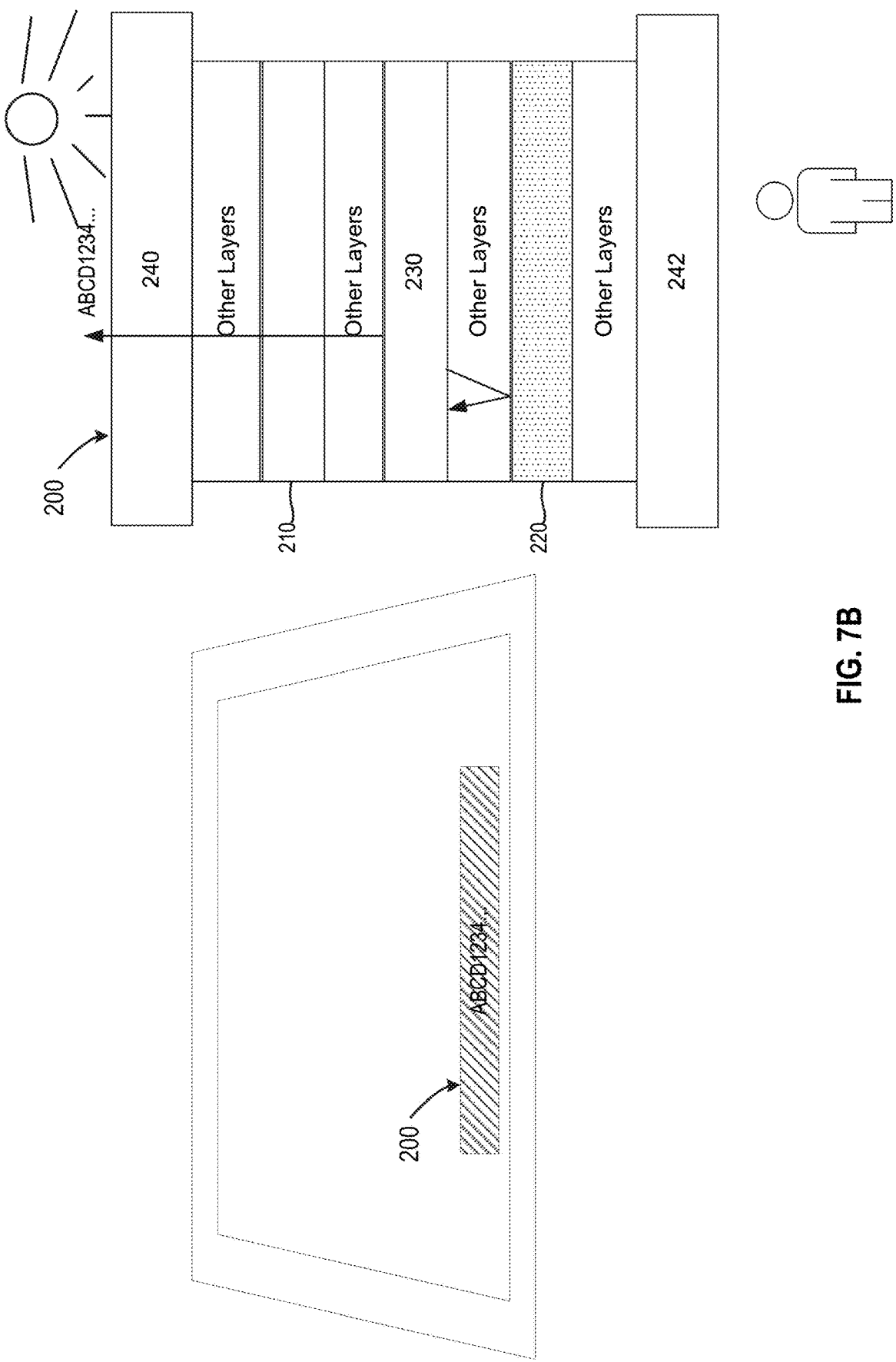
FIG. 7B illustrates an example dimmable LCD performing an outside display function according to embodiments of the present disclosure.

Similarly, for another example, FIG. 7B illustrates an example of dimmable LCD 200 configured to operate in an outside display function according to certain embodiments. As shown in FIG. 7B, when OLED layer 230 is ON (e.g., displays content/information), dimmable LCD 200 can operate in the outside display function by controlling the dimming state of LC-A 210 and LC-B 220 (e.g., LC-A 210 is in OFF state and LC-B 220 is in ON state). Accordingly, LC-B 220 may block light incident from OLED layer 230, preventing it from entering the inside of the vehicle. LC-B 220 may also appear dimmed to viewers inside the vehicle which further blocks the content/information displayed by OLED layer 230 from being viewed from the interior the vehicle. Thus, the content/information displayed by OLED layer 230 would not be viewable from the interior of the vehicle. Accordingly, when operating in the outside display function, information displayed by OLED layer 230 is directed toward the outside. For example, the viewer may be a person such as a bystander, a pedestrian, etc., outside the vehicle. Accordingly, information such as an advertisement or signaling shown to the outside viewer will not distract the inside user (e.g., the driver of the vehicle). Table 2 summarizes how display functions of dimmable LCD 200 is controlled by dimming state of LC-A 210 and LC-B 220.

TABLE 2

| LC-A | OLED | LC-B | Functions |
|------|------|------|-----------|
| on   | on   | off  | Inside display |
| off  | on   | on   | Outside display |
| on   | on   | on   | Dimmed inside display |

An additional advantage of combining multiple layers to form the multi-cell LCD (e.g., the dimmable LCD disclosed herein) is that one or more layers, such as LC-A 210, can be configured to support a mirror function with improved reflectivity due to making the back of the mirror dark. FIG. 2B illustrates an example dimmable LCD 205 configured to operate in a mirror mode according to certain embodiments. Dimmable LCD 205 may have the same structure as dimmable LCD 200 except for OLED layer 230 is replaced with a controllable mirror layer 235. In some embodiments, controllable mirror layer 235 may be a mirror, a component of a mirror, or an optical device that functions as a mirror in certain conditions. For example, controllable mirror layer 235 may be any suitable reciprocal mirror that appears reflective from one side of the mirror (e.g., a lighten side) and transparent at the other side (e.g., a darken side). The one-way transmission for controllable mirror 235 layer can be achieved when one side of controllable mirror layer 235 is bright (e.g., the ambient light is strong), and the other side is dark (the ambient light is weak). In other words, controllable mirror layer 235 functions as a normal mirror to viewers from a lighten side while functions as a see-through glass to viewers from a darkened side.

In some embodiments, dimmable LCD 205 can perform a mirror function when operating in a mirror mode. The ON and Off of the mirror mode can be achieved by controlling the dimming state of LC-A 210 while keeping LC-B 220 in OFF state. For example, FIG. 8 illustrates an example of dimmable LCD 205 configured to operate in the mirror function according to certain embodiments. Specifically, when LC-A 210 is in ON state, LC-A 210 blocks a portion of light incident upon LC-A 210 (e.g., 80%, 85%, 90%, 95%, etc.) from the exterior, making the LC-A 210 side (e.g., the outside of the vehicle) a darkened side of mirror 235. Accordingly, viewer from the inside of the vehicle can use dimmable LCD 205 as a normal mirror when the mirror mode is on. Moreover, because the background for controllable mirror layer 235 is dark (e.g., LC-A 210 blocks most of light incident upon LC-A 210 from the exterior), the reflectivity for controllable mirror layer 235 can be improved compared with conventional LCDs with a mirror function.

Table 3 summarizes how the mirror function of dimmable LCD 200 is controlled by dimming state of LC-A 210 and LC-B 220.

TABLE 3

| LC-A | Mirror | LC-B | Function |
|---|---|---|---|
| on | on | off | Inside mirror function |

Figure 9:
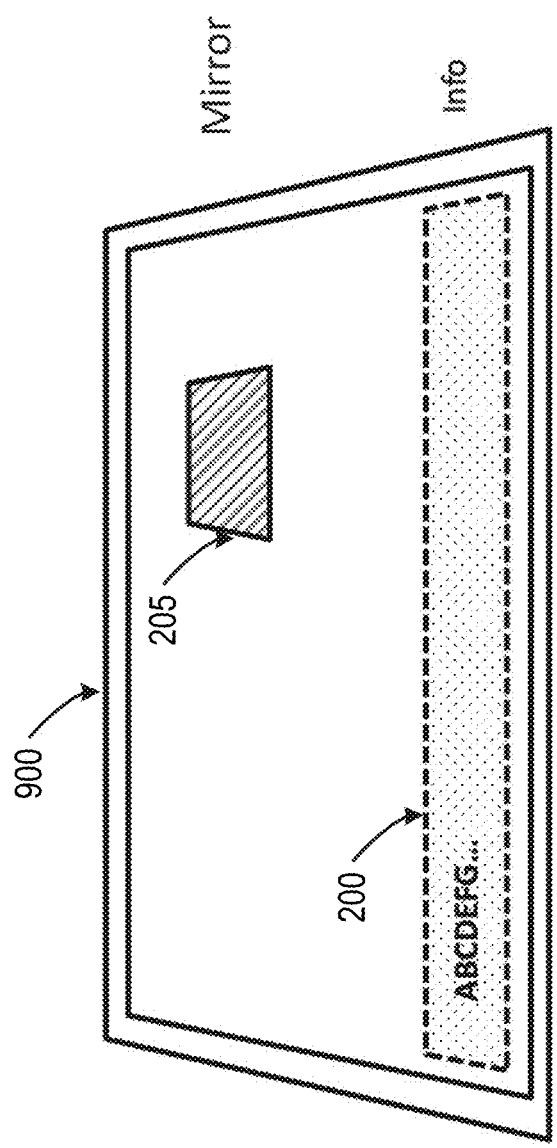
FIG. 9 illustrates schematic diagrams of exemplary layouts of a window equipped with one or more dimmable LCD according to embodiments of the present disclosure.

In addition to operating in different modes individually, one or more dimmable LCD structures disclosed herein can be combined (e.g., occupy different area(s) of some window) to perform different functions separately or simultaneously. For example, the dimmable LCD structure may achieve a combination of the mirror function and the display function. FIG. 9 shows a top view of an LCD structure 900 featuring a combination of mirror and display functions. The combined mirror function and display function depicted in FIG. 9 can be achieved based on different variations of the dimmable LCDs disclosed herein. For examples, to achieve a combination of mirror and display functions, both dimmable LCDs 200 and 205 may be integrated into one window, each occupying a specific area respectively. Specially, as illustrated in FIG. 9, dimmable LCD 200 may occupy a lower portion of the window for the display function (e.g., displaying information toward inside and/or outside) and dimmable LCD 205 may occupy an upper portion of the window for performing the mirror function. Dimmable LCDs 200 and 205 can be controlled separately or by a shared controller disclosed above. It is understood that the layout (e.g., the relative position of dimmable LCDs 200 and 205) and the number of dimmable LCDs 200 and 205 for forming LCD structure 900 is not limited to the example shown in FIG. 9. Any suitable combination thereof without deviating from the spirit of the description can be implemented.

In some other embodiments, to achieve a combination of the mirror function and the display function, LCD structure 900 may correspond to dimmable LCD 200 as shown in FIG. 2A with an additional mirror layer (e.g., similar to controllable mirror layer 235 in dimmable LCD 205) disposed between LC-A 210 and LC-B 220 (e.g., additional cells in addition to three-cell structure 202 of dimmable LCD 200). For example, the additional mirror layer may be disposed above or below OLED layer 230 in dimmable LCD 200, separated by other layers (e.g., the possible additional layers) according to the scheme disclosed in the description of FIGS. 2A and 2B. In some other embodiments, LCD structure 900 may also correspond to dimmable LCD 205 shown in FIG. 2B with an additional OLED layer (e.g., similar to OLED layer 230 in dimmable LCD 200) disposed between LC-A 210 and LC-B 220 (e.g., additional cells in addition to three-cell structure 202 of dimmable LCD 205). For example, the additional OLED layer may be disposed above or below controllable mirror layer 235 in dimmable LCD 205, separated by other layers (e.g., the possible additional layers) according to the scheme disclosed in the description of FIGS. 2A and 2B.

Alternatively, in some further embodiments, to achieve a combination of mirror and display functions, LCD structure 900 may correspond to dimmable LCD 200 or 205 with an additional set of layers stacked on top of LC-A 210 or below LC-B 220 (e.g., additional cells in addition to the three-cell structure of dimmable LCD 200). For example, the additional set of layers (e.g., in addition to a three-cell structure including an OLED layer in the middle) may be in another three-cell structure that includes a controllable mirror layer sandwiched between another pair of LC layers. Specifically, the controllable mirror layer in the additional set of layers may be sandwiched by a third LC layer and a fourth layer in a manner similar to three-cell structure 202 shown in FIG. 2A.

By combining different functions on a same LCD structure having the multi-cell structure, the functionality of the LCD structure can be greatly expended. The window having the LCD structure can perform multiple functions simultaneously (e.g., display information to the exterior while perform the mirror function to the interior). It is understood that any other suitable combination of different functions can be achieved without deviating from the spirit of the description.

Figure 10:
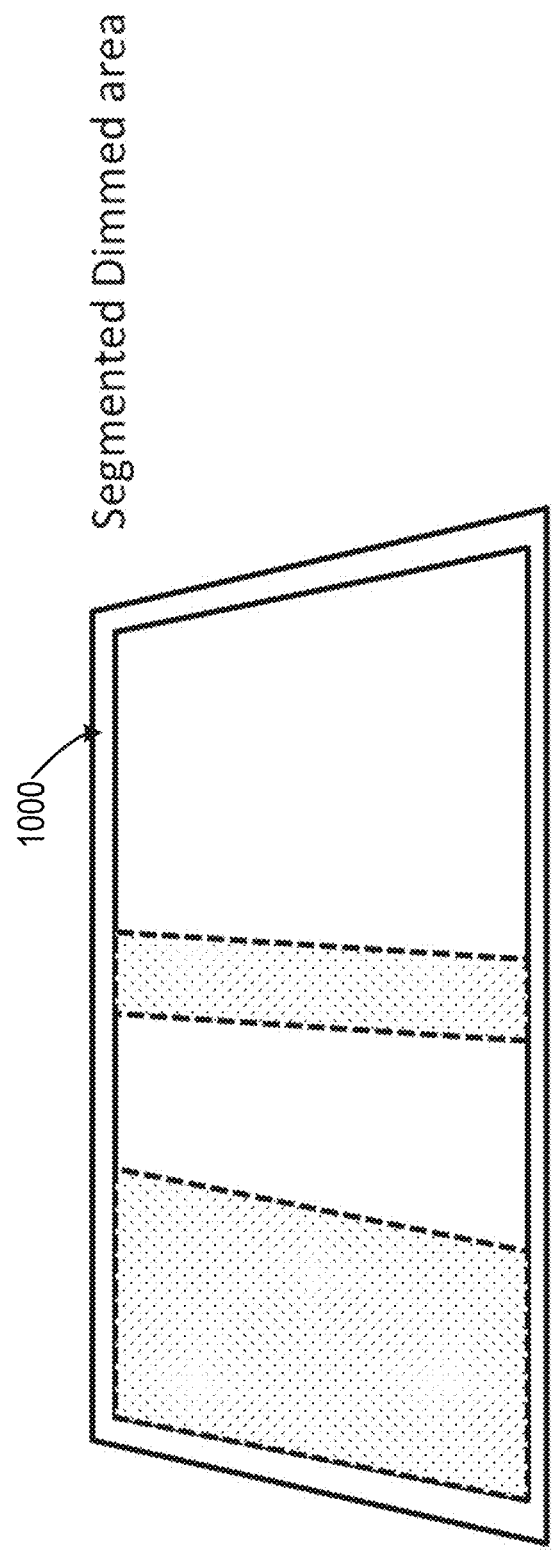
FIG. 10 illustrates schematic diagrams of exemplary layouts of a window with segmented dimmable area, according to embodiments of the present disclosure.

In some embodiments, when performing different functions, the individual dimmable LCD (e.g., dimmable LCD 200 or 205) may also be divided into different segments that are individually dimmable so that a portion of the dimmable LCD surface can be individually controlled (e.g., different segments work in different dimming modes and/or perform different functions). Specifically, FIG. 10 shows a top view of an LCD structure 1000 in which the dimmable LCD is divided into different segments that are individually controllable so that different portion of the LCD surface may work in different modes. For example, LCD structure 1000 may be segmented into different portions vertically as illustrated in FIG. 10, horizontally, or into arbitrary shapes, depending on the users needs. In some embodiments, instead of integrating different dimmable LCDs 200 and/or 205, segmentation on LCD structure 1000 may be implemented by segmenting at least one LC layer (e.g., LC-A 210, LC-B 220, or both) of the dimmable LCD (e.g., dimmable LCD 200 and/or 205). The segmented LC layer(s) can be individually controlled by a same controller or different controllers so that they may have different degree of dimming. Accordingly, different portions of LCD structure 1000 may work in different dimming modes such as some of the portions may be in the transparent mode while the rest may be in the full darkening/dimming mode, and different portions of LCD structure 1000 may work in different functions such as some of the portions may operate the inside display function while the rest may operate in the outside display function.

Figure 11:
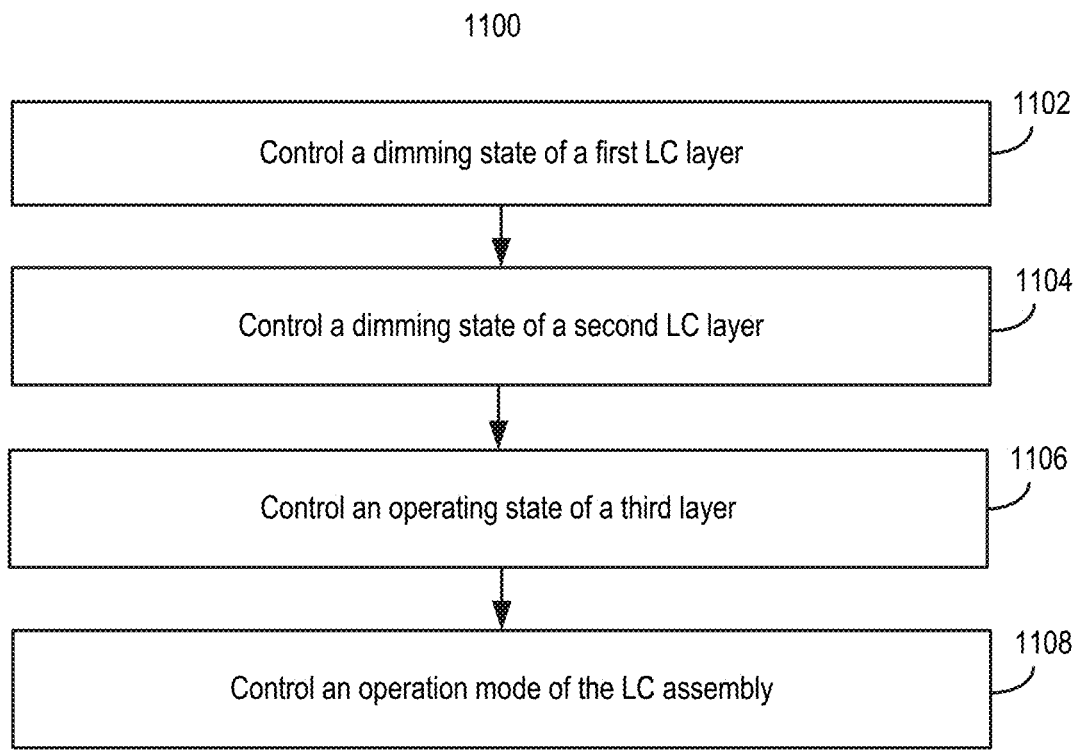
FIG. 11 illustrates a flow chat of a method for controlling a LC assembly, according to embodiments of the present disclosure.

FIG. 11 illustrates a flow chart of a method 1100 for controlling a LC assembly according to certain embodiments. The steps described in method 1100 are for illustration purposes only and are not intended to be limiting. In various implementations, modifications may be made to method 1100 to add additional steps, omit some steps, merge some steps, simultaneously perform some steps, or split a step. Method 1100 may be better understood along with descriptions of FIGS. 2A and 2B, and FIGS. 3A-3C.

In step S1102, a dimming state of a first LC layer (e.g., LC-A 210 shown in FIGS. 2A and 2B) of the LC assembly (e.g., dimmable LCDs 200 or 205) may be controlled by controlling an electric signal applied to liquid crystals located between a first pair of substrates of the first LC layer. For example, as disclosed above, a controller/processer may be used to control the electric signal applied to liquid crystals located between the second pair of substrates of the first LC layer. The alignment of liquid crystals may be adjusted accordingly and the light transmittance of the first LC layer (e.g., to be in ON state or OFF state) may be adjusted as a result.

In step S1104, a dimming state of a second LC layer (e.g., LC-B 220 shown in FIGS. 2A and 2B) of the LC assembly (e.g., dimmable LCDs 200 or 205) may also be controlled by controlling an electric signal applied to liquid crystals located between a second pair of substrates of the second LC layer. Similar to the control of the first LC layer, a same or a different controller/processer may be used to control the electric signal applied to liquid crystals located between the second pair of substrates of the first LC layer. The alignment of liquid crystals may be adjusted accordingly and the light transmittance of the second LC layer (e.g., to be in ON state or OFF state) may be adjusted as a result.

In step S1106, an operating state of a third layer of the LC assembly may be controlled. As disclosed above, the third layer is disposed between the first layer and the second layer, and the third layer may correspond to an OLED layer or a controllable mirror layer (e.g., OLED layer 230 or controllable mirror layer 235 in FIGS. 2A and 2B). In some embodiments, when the third layer corresponds to the OLED layer (e.g., the LC assembly being dimmable LCD 200), the OLED layer may be controlled by a same or a different controller/processer to display (e.g., in ON state) or not to display (e.g., in OFF state) content/information. In some other embodiments, when the third layer corresponds to the controllable mirror layer or an OLED layer, (e.g., the LC assembly being dimmable LCD 205), the controllable mirror layer may be controlled to appear reflective (e.g., in ON state to perform a mirror function) or transparent (e.g., in OFF state for see-through) from the interior of a vehicle by controlling the dimming state of the first and the second LC layer. For example, when the first LC layer is in ON state and the second LC layer is in OFF state, the side of the controllable mirror layer closer to the exterior of the vehicle would be the darken side of the controllable mirror layer (e.g., appears transparent to a viewer from this side of the controllable mirror layer) and the side of the controllable mirror layer closer to the interior of the vehicle would be the lighten side (e.g., appears reflective to a viewer from this side the controllable mirror layer).

In step S1108, an operating mode of the LC assembly may be controlled based on controlling the dimming state of the first layer and the second layer. Specifically, when the third layer of the LC assembly corresponds to the OLED layer (e.g., the LC assembly being dimmable LCD 200), and when the OLED layer is OFF (e.g., not displaying information), the LC assembly may operates in a transparent mode, a medium darkening/dimming mode, or a full darkening/dimming mode according to the dimming state of the first layer and the second layer according to table 1 that summarizes how operating modes of the LC assembly (e.g., dimmable LCD 200) is controlled by dimming state of the first layer and the second layer (e.g., LC-A 210 and LC-B 220). For ease of illustration, the scheme for controlling the operating mode of the LC assembly will not be repeated.

Figure 12:
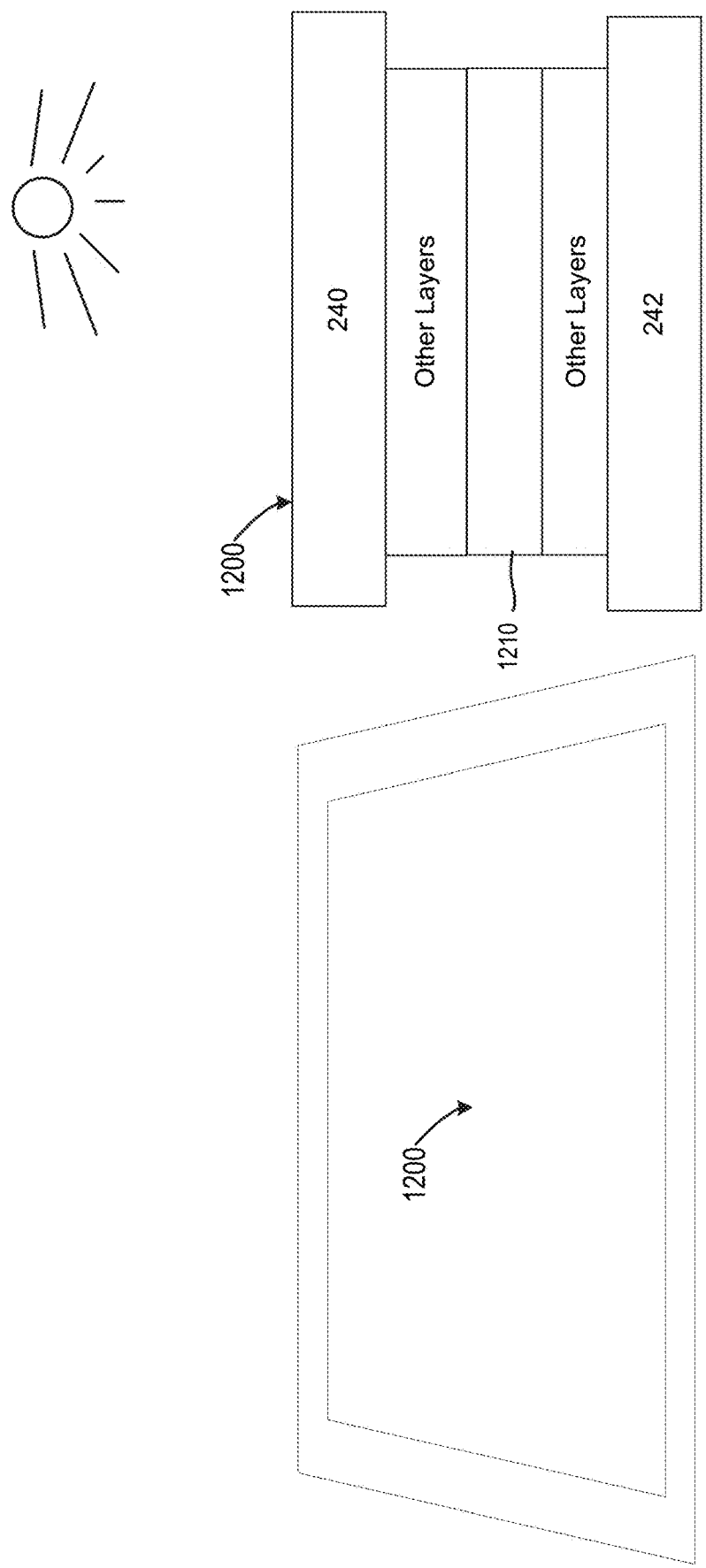
FIG. 12 illustrates schematic diagrams of an example dimmable LCD structure according to embodiments of the present disclosure.

In some embodiments, the dimmable LCD (e.g., the LCD assembly) may also include a single LC layer sandwiched by two curved glasses. For example, FIG. 12 illustrates schematic diagrams of an example dimmable LCD 1200 according to embodiments of the present disclosure. Different from dimmable LCD 200, instead of having LC-A 210 and LC-B 220, dimmable LCD 1200 includes one flexible LC stack structure (e.g., a LC layer 1210). Specifically, as illustrated in FIG. 12, LC layer 1210 is disposed between/sandwiched by two safety glasses (e.g., safety glass layers 240 and 242). In other words, LC layer 1210 corresponds to a cell disposed in the middle of safety glass layers 240 and 242. Similar to dimmable LCD 200, dimmable LCD 1200 may include additional layers (e.g., other layers in FIG. 12) disposed between LC layer 1210 and safety glass layers 240 and 242, separating LC layer 1210 and safety glass layers 240 and 242. Examples of such additional layers may include but not limited to polarizers, protective films, compensation films (e.g. triacetate, TAC), conductive layers (e.g. indium tin oxide, ITO), adhesives (e.g. optically clear adhesive, OCA), thin film transistor layers (TFT), etc. These additional layers may also include layers that are used for another function, e.g. a layer for ultraviolet (UV) or infrared protection.

In some embodiments, LC layer 1210 may be a film-based LC layer that includes a LC cell (e.g., the LC cell disclosed in FIGS. 3A-3C). The film-based LC layer can provide flexibility to LC layer 1210 to fit the curvature of safety glass layers 240 and 242. Accordingly, dimmable LCD 1200 can form window of different shapes (e.g., side windows, windshields, a curved architecture glass panel, or other specially shaped windows). In some embodiments, LC layer 1210 may include a pair of substrates (e.g., first substrate 302 and second substrate 312 as illustrated in FIG. 3A) and liquid crystals (e.g., liquid crystal 314) disposed in between. In some embodiments, LC layer 1210 may include other components such as spacers, polyamide (PI) layers, sealants, etc., depending on the type of liquid crystal that layer 1210 includes.

In some embodiments, to fit the curvature of safety glass layers 240 and 242, the pair of substrates can be made of materials such as glass, or a flexible material such as polycarbonate (PC), polyethylene terephthalate (PET), or cellulose triacetate (TAC), which allows LC layer 1210 to conform to a curved surface. In some embodiments, the liquid crystals (e.g., liquid crystal 314) disposed between the pair of substrates include a twisted nematic (TN) liquid crystal as illustrated in FIG. 3B. In some other embodiments, the liquid crystals include a Guest-Host (GH) liquid crystal as illustrated in FIG. 3C. Accordingly, LC layer 1210 may operate in different dimming states to perform the dimming operations (e.g., reducing a transmittance level of light passing through the LC assembly) by applying different electrical signals to the pair of substrates. For example, the pair of substrates may be coated with an electrical conductive material (e.g., Indium tin oxide (ITO)) to conduct a voltage when the electrical signals are applied, which can lead to an electric field being applied across the liquid crystals disposed in between to change the orientations of the liquid crystal molecules from their default orientations.

Figure 13A:
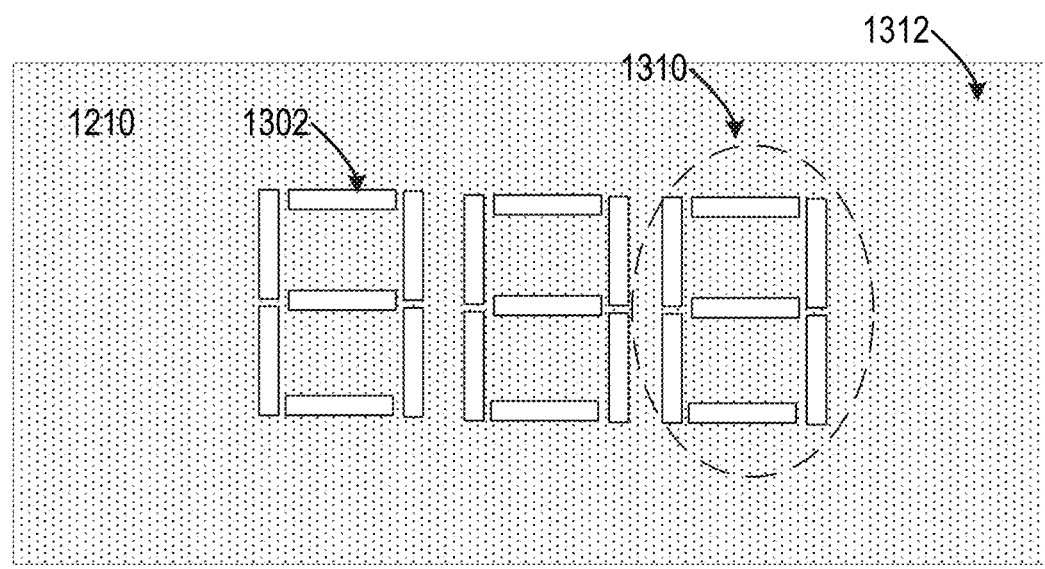
FIGS. 13A and 13B illustrate examples of segmentation of a LC layer according to embodiments of the present disclosure.
Figure 13B:
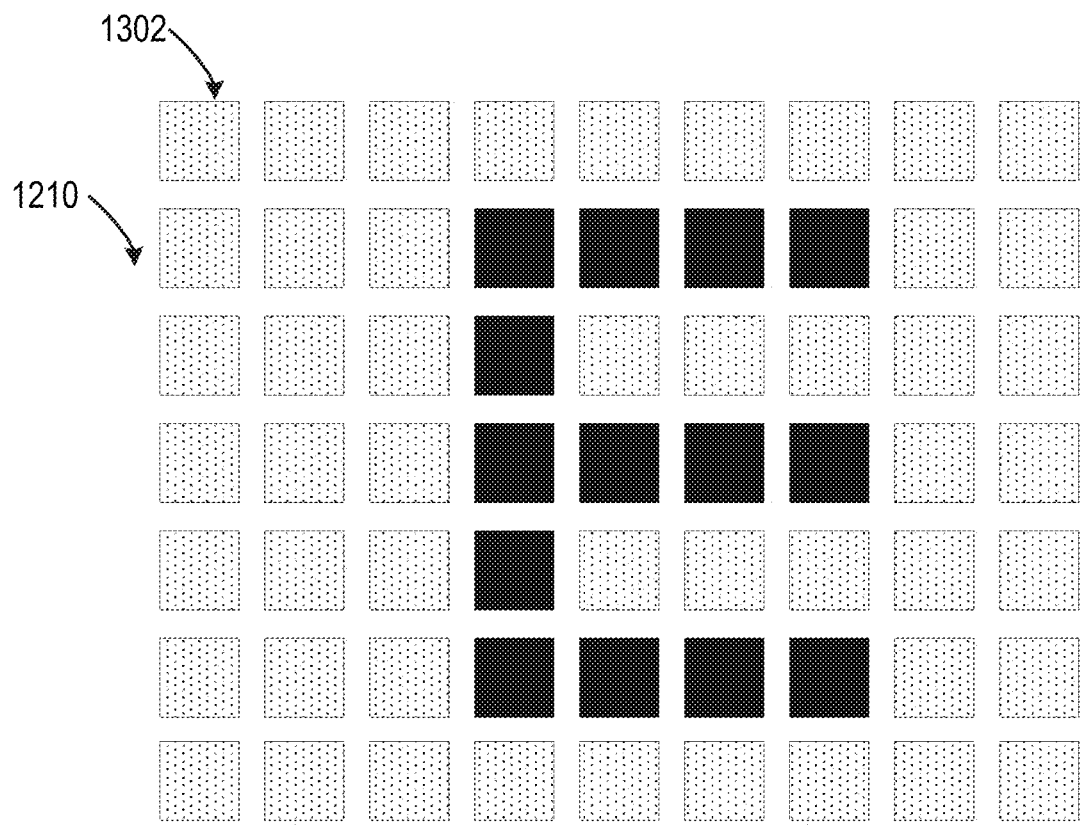

In some embodiments, LC layer 1210 may perform the display operations (e.g., displaying content to one or more user) in addition to the dimming operation. FIGS. 13A and 13B illustrate examples of segmentation of LC layer 1210 according to embodiments of the present disclosure. In some embodiments, as illustrated in FIG. 13A, LC layer 1210 may be segmented into a several segments arrangement (e.g., segmented into 0-100 segments) for displays. For example, LC layer 1210 may be segmented into several sets of 7-segment arrangements (e.g., 7-segment arrangement 1310) and a background segment 1312 (e.g., the portion of LC layer 1210 not segmented into segment arrangements, e.g., the pattern filled portion in FIG. 13B) for segmented displays (e.g., number displays).

A dimming state of each controllable segment of LC layer 1210 (e.g., controllable segment 1302) may be individually controllable, namely the dimming state of each segment may be controlled independently by controller(s). For example, dimmable LCD 1200 may further include multiply controllers corresponding to the several controllable segments. Each of the controller may control the corresponding controllable segment 1302 based on a direct driving scheme (e.g., apply a direct drive voltage and/or current to the pair of substrates of each controllable segment 1302). As described above, the generated electrical signal (e.g., the direct drive voltage and/or current) may be used for controlling an alignment of the liquid crystals (e.g., GH liquid crystals or TN liquid crystals) located between the pair of substrates of the corresponding controllable segment.

As illustrated in FIG. 13A, when performing the dimming operation, at least background segment 1312 may be dimmed to block some of light incident on dimmable LCD 1200 (e.g., operating in a full darkening/dimming mode or a medium darkening/dimming mode). When performing the display operations in addition to the dimming operation, a predetermined first subset of controllable segments (e.g., a first subset of pixel segments) may be dimmed to a different dimming state than background segment 1312. The rest of controllable segments (e.g., a second subset of pixel segments, not included in the predetermined first subset of pixel segments) may be dimed in a same dimming state as background segment 1312. For example, the predetermined first subset of controllable segments may be dimmed to a greater degree or lesser degree than background segment 1312, and the rest of the controllable segments. The size, shape, and/or constituents of the first subset of controllable segments may be determined based on the content to be displayed. Accordingly, the predetermined first subset of controllable segments may be contrasted by background segment 1312 and the second subset of controllable segments by different dimming extent.

In some other embodiments, when performing more complicated displays (e.g., a graphical display with higher resolution), LC layer 1210 may be segmented into pixeled segment arrangements (e.g., segmented into more than 100 segments). For example, LC layer 1210 may be segmented into a two-dimensional array of "dots" where each "dot" is constituted by controllable segment 1302. For example, LC layer 1210 may be segmented into a two-dimensional array of N*M "dots" (e.g., a matrix of controllable segments 1302 consisting of N row of controllable segments 1302, each row has M controllable segments 1302, where N and M are both positive integers). A dimming state of each segment of LC layer 1210 (e.g., controllable segment 1302) may be individually controllable, namely the dimming state of each segment may be controlled separately. For example, dimmable LCD 1200 may further include a controller collectively control the dimming state of each controllable segment 1302 based on a passive matrix driving scheme (e.g., pixel segments are addressed row by row, and also is called time multiplexing control). As described above, the generated electrical signal (e.g., the drive voltage and/or current) may be used for controlling an alignment of the liquid crystals (e.g., GH liquid crystals or TN liquid crystals) located between the pair of substrates of the corresponding controllable segment.

Similar to the configuration illustrated in FIG. 13A, in FIG. 13B, when performing the dimming operation, at least a second subset of pixel segments (e.g., controllable segments not included in the predetermined first subset of pixel segments) may be dimmed to block some of light incident on dimmable LCD 1200. In some embodiments, when displaying the second subset of pixel segments performs similar to background segments 1312 to provide contrast to the predetermined first subset of pixel segments, but may be dynamically adjusted according to a predetermined first subset of controllable segments for displaying.

When performing the display operations in addition to the dimming operation, the predetermined first subset of pixel segments (e.g., the predetermined first subset of pixel segments) may be dimmed to a different dimming state than the rest of controllable segments (e.g., the second subset of pixel segments). The size, shape, and/or constituents of first subset of pixel segments may be determined based on the content to be displayed. Accordingly, the predetermined first subset of controllable segments may be contrasted by the second subset of controllable segments by different dimming state (e.g., a greater or lighter dimming state).

It is understood that dimmable LCD 1200 disclosed herein can also perform a non-dimming display where background segment 1312 and the second subset of controllable segments (e.g., the non-displaying controllable segments) may operate in a transparent mode, and the predetermined first subset of controllable segments may operate in a dimming mode different from the transparent mode, so long as there is a contrast between the predetermined first subset of pixel segments and background segment 1312 and/or the second subset of pixel segments.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A liquid crystal (LC) assembly comprising:
a first curved glass layer;
a second curved glass layer; and
a film-based, flexible LC stack structure between the first curved glass layer and the second curved glass layer, the film-based, flexible LC stack structure comprising Guest-Host (GH) liquid crystals,
wherein the film-based, flexible LC stack structure is configured to provide both a display operation for displaying content to one or more user and a dimming operation for reducing a transmittance level of light passing through the LC assembly,
wherein the film-based, flexible LC stack structure comprises a plurality of controllable segments, wherein a dimming state of each of the plurality of controllable segments is individually controllable, and
wherein the plurality of controllable segments comprises:
a background segment configured to provide the dimming operation; and
a plurality of pixel segments configured to provide the display operation by operating a first subset of the plurality of pixel segments in a different dimming state than the background segment.

2. The LC assembly of claim 1, wherein the plurality of pixel segments are configured to provide the display operation by operating a second subset of the plurality of pixel segments in a same dimming state as the background segment.

3. The LC assembly of claim 1, wherein each of the plurality of controllable segments comprises a pair of substrates, and each of the plurality of controllable segments is dimmable using an electrical signal to control an alignment of the GH liquid crystals located between the pair of substrates of the controllable segment.

4. The LC assembly of claim 3, wherein each of the plurality of controllable segments is controlled based on a direct drive voltage and/or current.

5. The LC assembly of claim 4, further comprises a plurality of controllers, each corresponding to a controllable segment of the plurality of controllable segments, wherein each of the plurality of controllers is configured to generate an electrical signal for controlling an alignment of the GH liquid crystals located between the pair of substrates of the corresponding controllable segment.

6. The LC assembly of claim 3, wherein each of the plurality of controllable segments is controlled based on time multiplexing.

7. A liquid crystal (LC) assembly comprising: a first curved glass layer; a second curved glass layer; and a film-based, flexible LC stack structure between the first curved glass layer and the second curved glass layer, the film-based, flexible LC stack structure comprising twisted nematic (TN) liquid crystals, wherein the film-based, flexible LC stack structure is configured to provide both a display operation for displaying content to one or more user and a dimming operation for reducing a transmittance level of light passing through the LC assembly,
wherein the film-based, flexible LC stack structure comprises a plurality of controllable segments, wherein a dimming state of each controllable segment is individually controllable, and
wherein the plurality of controllable segments comprises:
a background segment configured to provide the dimming operation; and
a plurality of pixel segments configured to provide the display operation by operating a first subset of the plurality of pixel segments in a different dimming state than the background segment.

8. The LC assembly of claim 7, wherein the plurality of pixel segments are configured to provide the display operation by operating a second subset of the plurality of pixel segments in a same dimming state as the background segment.

9. The LC assembly of claim 7, wherein each of the plurality of controllable segments comprises a pair of substrates, and each of the plurality of controllable segments is dimmable using an electrical signal to control an alignment of the TN liquid crystals located between the pair of substrates of the controllable segment.

10. The LC assembly of claim 9, wherein each of the plurality of controllable segments is controlled based on a direct drive voltage and/or current.

11. The LC assembly of claim 10, further comprises a plurality of controllers, each corresponding to a controllable segment of the plurality of controllable segments, wherein each of the plurality of controllers is configured to generate an electrical signal for controlling an alignment of the TN liquid crystals located between the pair of substrates of the corresponding controllable segment.

12. The LC assembly of claim 11, wherein each of the plurality of controllable segments is controlled based on time multiplexing.

* * * * *